United States Patent [19]
Kitaori et al.

[11] Patent Number: 5,800,917
[45] Date of Patent: Sep. 1, 1998

[54] MAGNETIC RECORDING MEDIUM

[75] Inventors: Noriyuki Kitaori; Osamu Yoshida; Katsumi Sasaki; Junko Ishikawa; Katsumi Endo, all of Tochigi, Japan

[73] Assignee: Kao Corporation, Tokyo, Japan

[21] Appl. No.: 717,727

[22] Filed: Sep. 23, 1996

[30] Foreign Application Priority Data

| Sep. 28, 1995 | [JP] | Japan | 7-250430 |
| Sep. 28, 1995 | [JP] | Japan | 7-250431 |
| Sep. 28, 1995 | [JP] | Japan | 7-250432 |
| Sep. 28, 1995 | [JP] | Japan | 7-250747 |

[51] Int. Cl.$^6$ ................................................. G11B 5/66
[52] U.S. Cl. .......... 428/332; 428/336; 428/694 T; 428/694 TS; 428/694 TP; 428/694 TC; 428/694 TF; 428/900
[58] Field of Search ............ 428/694 T, 694 TS, 428/694 TB, 694 TC, 694 TF, 900, 336, 332

[56] References Cited

U.S. PATENT DOCUMENTS

| 4,873,154 | 10/1989 | Yasunaga | 428/694 T |
| 5,538,802 | 7/1996 | Kitaori | 428/694 T |

*Primary Examiner*—Leszek Kiliman
*Attorney, Agent, or Firm*—Oblon, Spivak, McClelland, Maier & Neustadt, P.C.

[57] ABSTRACT

A magnetic recording medium comprising a substrate and a magnetic layer, wherein the magnetic layer is coated on the substrate, the magnetic layer is an Fe—C—O magnetic layer and has a oblique column structure, and an O concentration (at. %) Oc in a center part of the column and an O concentration (at. %) Os around a surface part of the column satisfy Oc<Os. The magnetic recording medium has an excellent S/N, and has excellent corrosion resistance and durability.

23 Claims, 13 Drawing Sheets

MAGNETIC RECORDING MEDIUM

BACKGROUND OF THE PRESENT INVENTION

The present invention relates to a magnetic recording medium provided with an Fe—C—O magnetic film.

A magnetic recording medium of a metallic thin film type has been well known as being produced by depositing or spattering a magnetic film (layer). A magnetic alloy such as a Co—Ni, Co—Cr or the like has been used for producing the magnetic layer.

As the above metals, Co, Ni, Cr or the like are expensive, inexpensive metal such as an Fe has been increasingly expected for the application.

For example, a Publication of JP-A-54023/1986 has disclosed a magnetic recording medium provided with a magnetic layer formed of $Fe_{1-x-y}N_xO_y$, (where $0.25 \leq X+Y < 0.60$, $X > Y$). The recent trend requires the magnetic recording medium having more excellent S/N.

SUMMARY OF THE INVENTION

A first object of the present invention is to provide a magnetic recording medium having an excellent S/N.

A second object of the present invention is to provide a magnetic recording medium having excellent corrosion resistance and durability.

The object of the present invention is realized by a magnetic recording medium comprising a substrate and a magnetic layer. The magnetic layer is coated on the substrate. The magnetic layer is an Fe—C—O magnetic layer and has a diagonal column structure. An O concentration (at. %) Oc in a center part of the column and an O concentration (at. %) Os around a surface part of the column satisfy an equation of Oc<Os.

The object of the present invention is realized by a magnetic recording medium comprising a substrate and a magnetic layer. The magnetic layer as an Fe—C—O magnetic layer is coated on the substrate. Each profile of an Fe concentration, an O concentration and a C concentration derived from Auger electron spectroscopic analysis to the magnetic layer (a spattering direction is diagonal to said magnetic layer) is shown in a graph taking each concentration of Fe (at. %), C (at. %) and O (at. %) (Fe/at. % +C/at. %+O/at. %=100%) as an axis of ordinate and taking a spattering time as an axis of abscissa. Each concentration of Fe and O has a wave pattern.

The resultant magnetic recording medium has an excellent S/N.

The present invention provides a magnetic recording medium formed of a substrate and a magnetic layer. The magnetic layer as an Fe—C—O magnetic layer having a diagonal column structure is coated on the substrate. An O concentration Oc (at. %) in a center of the column and an O concentration Os (at. %) around a surface of the column satisfy the following equation [I]. A C concentration Cc (at. %) in a center of the column and a C concentration Cs (at. %) around a surface of the column further satisfy the following equation [II].

Equation [I]:

Oc<Os

Equation [II]:

Cc<Cs

The present invention provides a magnetic recording medium formed of a substrate and a magnetic layer. The magnetic layer as an Fe—C—O magnetic layer is coated on the substrate. Each concentration (at. %) of Fe, C and O (Fe/at. %+C/at. %+O/at. %=100%) is taken along an axis of ordinate to a spattering time as an axis of abscissa in Auger electron spectroscopic analysis. The resultant profiles of the respective concentrations have wave patterns.

The resultant magnetic recording medium has excellent corrosion resistance and durability.

The present invention provides a magnetic recording medium formed of a substrate and a magnetic layer. The magnetic layer as an Fe—C—O magnetic layer is coated on the substrate. Both an upper layer and a lower layer of the magnetic layer have areas where the O concentration is high. The layer between the upper layer and the lower layer has a low O concentration.

The resultant magnetic recording medium has excellent corrosion resistance and durability.

The present invention provides a magnetic recording medium formed of a substrate and a magnetic layer. The magnetic layer as an Fe—C—O magnetic layer is coated on the substrate. The O concentration in the upper layer is higher than that in the lower layer.

The resultant magnetic recording medium has excellent reproducing characteristics and corrosion resistance.

The upper layer of the magnetic layer ranges from the outermost surface of the magnetic layer to the depth ½ of a thickness of the magnetic layer. The lower layer of the magnetic layer ranges from the depth ½ of the thickness of the magnetic layer to a bottom surface thereof.

DETAILED DESCRIPTION OF THE INVENTION

Figure 1:
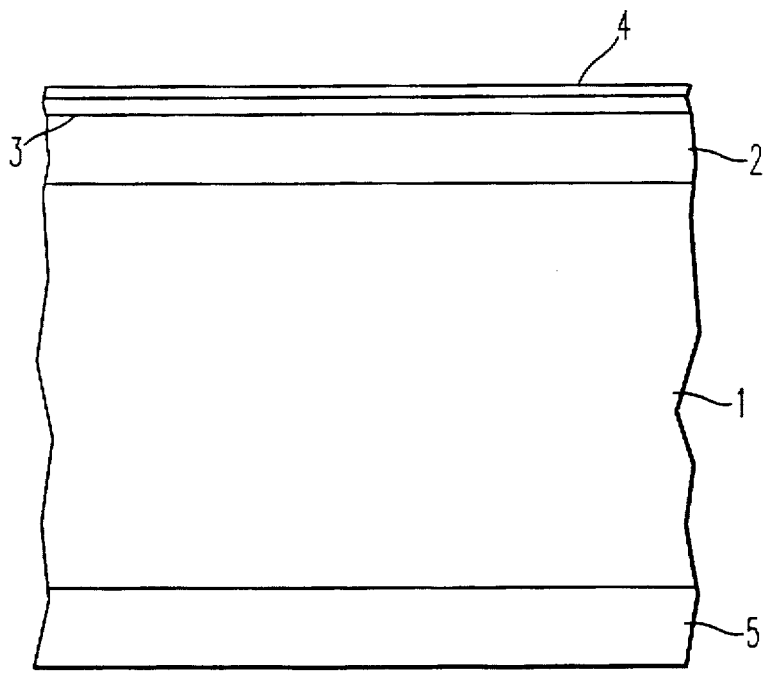
FIG. 1 is a sectional view of a magnetic recording medium of the present invention.

A magnetic recording medium of the present invention comprises a substrate 1 and a magnetic layer 2. The magnetic recording medium further comprises a protective layer 3, a lubricant layer 4 and a back coat layer 5. The magnetic layer 2 is coated on one surface of the substrate 1. The protective layer 3 is coated on the magnetic layer 2. The lubricant layer 4 is coated on the protective layer 3. The back coat layer 5 is coated on the other surface of the substrate 1.

The substrate 1 can be either a magnetic material or a non-magnetic material. However most of the conventional substrates have been formed of non-magnetic materials. The substrate 1 is formed of an organic material, for example, polyester such as polyethylene terephthalate (PET), an olefin resin such as polypropylene, polyamide, polyimide, polysulfone, polycarbonate and a cellulose resin, a vinyl chloride resin or the like. An under coat layer is coated on the surface of the substrate 1 for improving the adhesion of the magnetic layer.

The back coat layer 5 has a thickness ranging from 0.1 to 1 μm. The back coat layer 5 is produced through application of a paint containing a carbon black and a binder resin. The back coat layer 5 can be produced through deposition of a metal such as Al—Cu alloy. Either of the above processes can be used.

The protective layer 3 has a thickness ranging from 10 to 200 Å. The protective layer 3 is formed of, for example, a carbon such as a diamond-like carbon, graphite, silicon oxide, silicon carbide or the like. It is preferable to use the diamond-like carbon. The protective layer 3 can be produced through a chemical vapor deposition process.

The lubricant layer 4 has a thickness ranging from 2 to 50 Å, and preferably, from 10 to 30 Å. The lubricant layer 4 can be formed by a hydro-carbon lubricant, a fluorine-contained lubricant such as perfluoro polyether, or the like.

The magnetic layer 2 has a thickness ranging from 500 to 10000 Å, and more preferably, from 800 to 3000 Å.

The magnetic layer 2 has a coercive force Hc ranging from 900 to 1900 Oe, a saturated magnetic induction Bs ranging from 3500 to 7000 G and Br/Bs ranging from 0.6 to 0.99.

The magnetic layer 2 is formed of an Fe—C—O magnetic layer. It is preferable that each concentration (at. %) of Fe, C and O satisfies the following equation [III]. More preferably those concentration values satisfy the equation [IIIa].
Equation [III]:

$$50 \text{ at. \%} \leq \text{Fe concentration} \leq 90 \text{ at. \%}$$

$$5 \text{ at. \%} \leq \text{C concentration} \leq 35 \text{ at. \%}$$

$$5 \text{ at. \%} \leq \text{O concentration} \leq 35 \text{ at. \%}$$

Equation [IIIa]:

$$60 \text{ at. \%} \leq \text{Fe concentration} \leq 80 \text{ at. \%}$$

$$10 \text{ at. \%} \leq \text{C concentration} \leq 25 \text{ at. \%}$$

$$10 \text{ at. \%} \leq \text{O concentration} \leq 25 \text{ at. \%}$$

Figure 2:
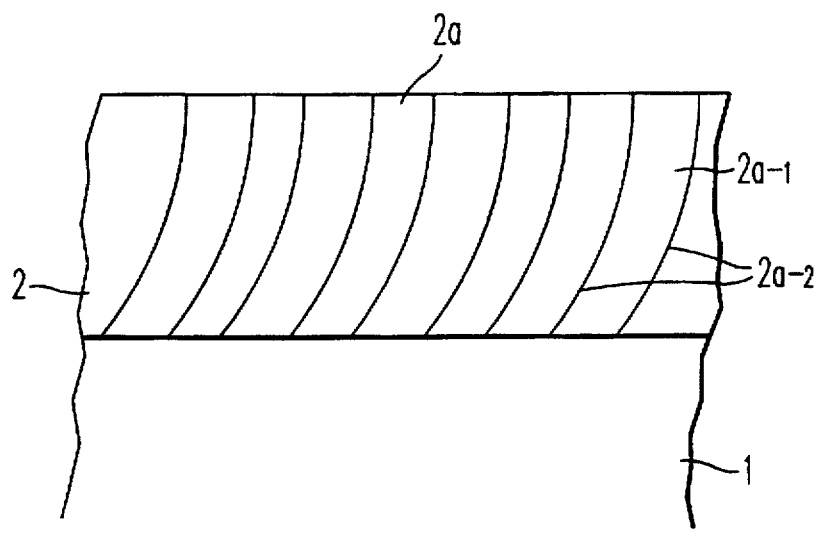
FIG. 2 is a sectional view of a magnetic column of a magnetic layer of the present invention.

As FIG. 2 shows, the magnetic layer 2 has a oblique column structure. That is, each column 2a of the magnetic layer 2 is obliquely formed. An O concentration Oc (at. %) in a center part 2a-1 of the magnetic column 2a and an O concentration Os (at. %) around a surface 2a-2 of the magnetic column 2a satisfy an equation [I], and preferably an equation [Ia].
Equation [I]:

$$Oc < Os$$

Equation [Ia]:

$$Oc + 3 \leq Os$$

$$Oc = 3-30 \text{ at. \%}$$

$$Os = 6-35 \text{ at. \%}$$

In a certain case, a C concentration Cc (at. %) in a center part 2a-1 of the magnetic column 2a and a C concentration Cs (at. %) around the surface 2a-2 of the magnetic column 2a satisfy an equation [II], and preferably an equation [IIa].
Equation [II]:

$$Cc < Cs$$

Equation [IIa]:

$$Cc + 3 \leq Cs$$

$$Cc = 3-30 \text{ at. \%}$$

$$Cs = 6-35 \text{ at. \%}$$

The magnetic layer 2 is subjected to the measurement of an Auger electron spectroscopic analyzing unit and the following characteristics are obtained. Spattering is obliquely executed to the magnetic layer 2.

(1) Each Auger profile of the Fe concentration and O concentration has a wave pattern. The term "Auger profile" stands for a graph taking each concentration of Fe (at. %), C (at. %) and O (at. %) (Fe/at. %+C/at. %+O/at. %=100%) as an axis of ordinate and taking a spattering time as an axis of abscissa.

The "wave pattern" of the Auger profile is defined by 3% or more amplitude deviation from a virtual center line (average value) except an initial peak. More specifically the wave pattern is specified only when the Auger profile having 3 or more peaks presents 3% or more amplitude deviation from the virtual center line except peaks at both ends. Accordingly the Auger profile having less than 2% of amplitude deviation is not considered as the wave pattern.

(2) Each Auger profile of the Fe/at. % and O/at. % observes a wave pattern having 5% or more amplitude deviation.

(3) Each Auger profile of the Fe/at. % and O/at. % has a wave pattern. The Auger profile of the C/at. % is kept constant. In case the amplitude deviation from the average value is less than 3%, the Auger profile is considered to have a constant pattern.

(4) Peak points of the Fe/at. % profile are correlated with bottom points of the O/at. % profile. Bottom points of the Fe/at. % profile are also correlated with peak points of the O/at. % profile.

(5) Each Auger profile of the Fe/ at. %, C/at. % and O/at. % has a wave pattern.

(6) Each Auger profile of the Fe/at. %, C/at. % and O/at. % has a wave pattern having 5% or more amplitude deviation.

(7) Peak points of the Fe/at. % profile are correlated with bottom points of the C/at. % profile. Peak points of the Fe/at. % profile are correlated with bottom points of the O/at. % profile. Bottom points of the Fe/at. % profile are correlated with peak points of the C/at. % profile. Bottom points of the Fe/at. % profile are correlated with peak points of the O/at. % profile.

The magnetic layer 2 is produced through an ion assist process. More specifically the magnetic layer is produced through the ion assist process comprising a deposition step for depositing Fe particles on the substrate, an irradiation step for irradiating carbon ions to the deposited Fe layer and another irradiation step for irradiating an oxide such as oxygen ion, oxygen gas or the like to the deposited Fe layer. Each amount of the carbon ion or the oxide is controlled to the desired value.

Figure 3:
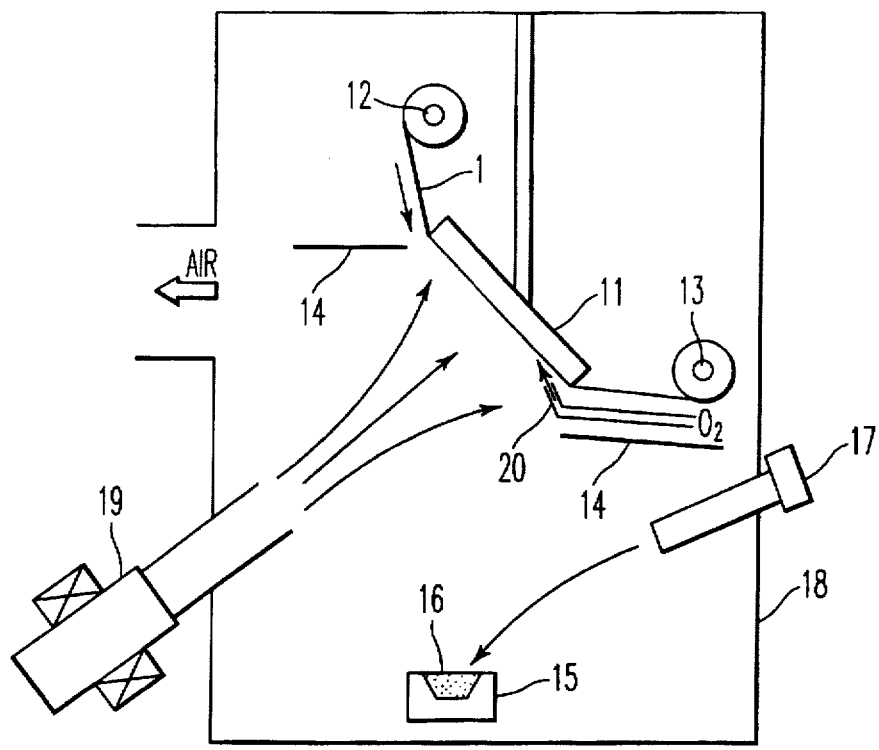
FIG. 3 is a schematic view of a first unit for producing the magnetic layer of the present invention.

For example, the magnetic layer 2 is produced with a unit shown in FIG. 3. Referring to FIG. 3, reference numerals 11, 12, 13, 14, 15 and 16 are a guide member, a supply roll for the substrate 1, a winding roll for the substrate 1, a cover plate, a crucible and an Fe, respectively. Reference numerals 17, 18, 19 and 20 are an electron gun, a vacuum vessel, an ion gun and a nozzle through which oxygen gas is supplied. The vacuum vessel 18 is vacuumed to a vacuum degree of $10^{-4}$ to $10^{-6}$ Torr. Then electron beam is irradiated from the electron gun 17 to the Fe 16 so that Fe particles evaporate and adhere to the substrate 1. A minimum incident angle of the depositing Fe particles ranges from 30° to 80° and preferably from 45° to 70°. When the Fe layer is being produced, the oxygen gas is obliquely sprayed through the nozzle 20 to the Fe layer in the direction opposite to the running direction of the substrate 1. The carbon ion is irradiated to the whole surface of the Fe layer being produced.

The guide member 11 can be replaced by a cooling can roll. Supply of the oxygen gas can also be replaced by irradiation of the oxygen ion.

Figure 4:
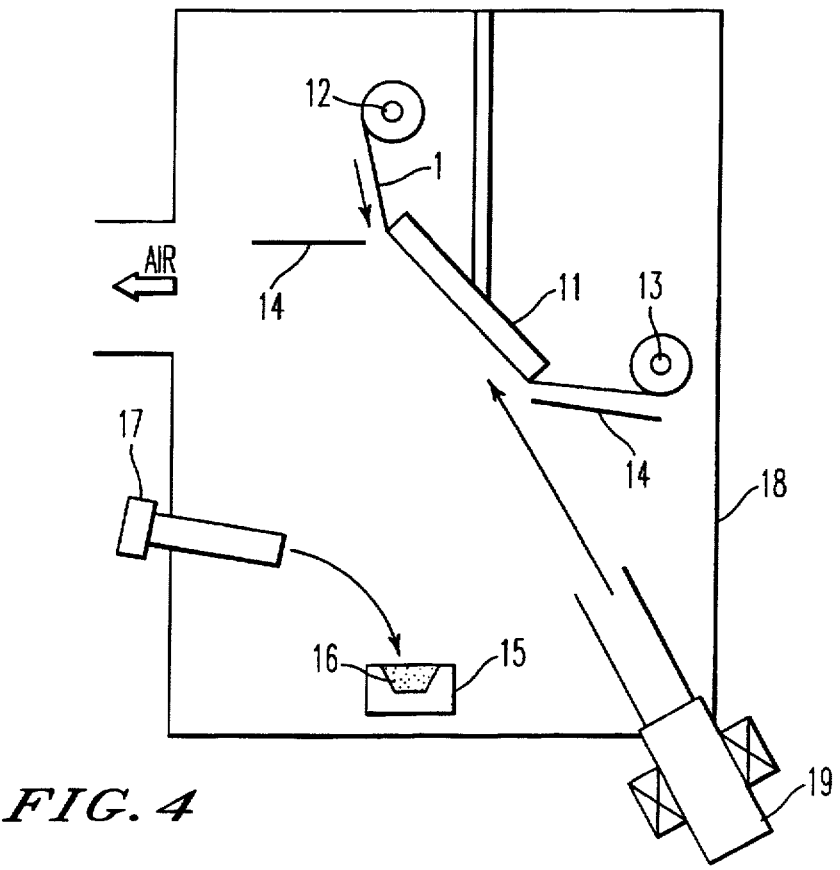
FIG. 4 is a schematic view of a second unit for producing the magnetic layer of the present invention.

The magnetic layer 2 is produced through the unit shown in FIG. 4. Referring to FIG. 4, reference numerals 11, 12, 13, 14, 15 and 16 are a guide member, a supply roll for the substrate 1, a winding roll for the substrate 1, a cover plate, a crucible and an Fe, respectively. The reference numerals 17, 18 and 19 are an electron gun, a vacuum vessel and an ion gun, respectively. The vacuum vessel 18 is vacuumed to a vacuum degree ranging from $10^{-4}$ to $10^{-6}$ Torr. Then the electron beam is irradiated from the electron gun 17 to the Fe 16. The Fe particles evaporate and adhere to the substrate 1. A minimum incident angle of the depositing Fe particles ranges from 30° to 80° and particularly from 45° to 70°. When the Fe layer is being produced, carbon ions and oxygen ions are obliquely irradiated from the ion gun 19 in the direction opposite to the running direction of the substrate 1.

The ion gun 19 irradiates both the carbon ions and oxygen ions. However, the carbon ions and the oxygen ions can be irradiated from the respective ion guns 19 separately. The oxygen ions can be replaced by the oxygen gas.

The magnetic layer 2 is formed of the Fe—C—O magnetic layer. However the magnetic layer formed of materials other than the Fe—C—O can also be used. In case a plurality of types of magnetic layers are provided, it is preferable that the Fe—C—O magnetic layer is formed as an uppermost layer.

Figure 5:
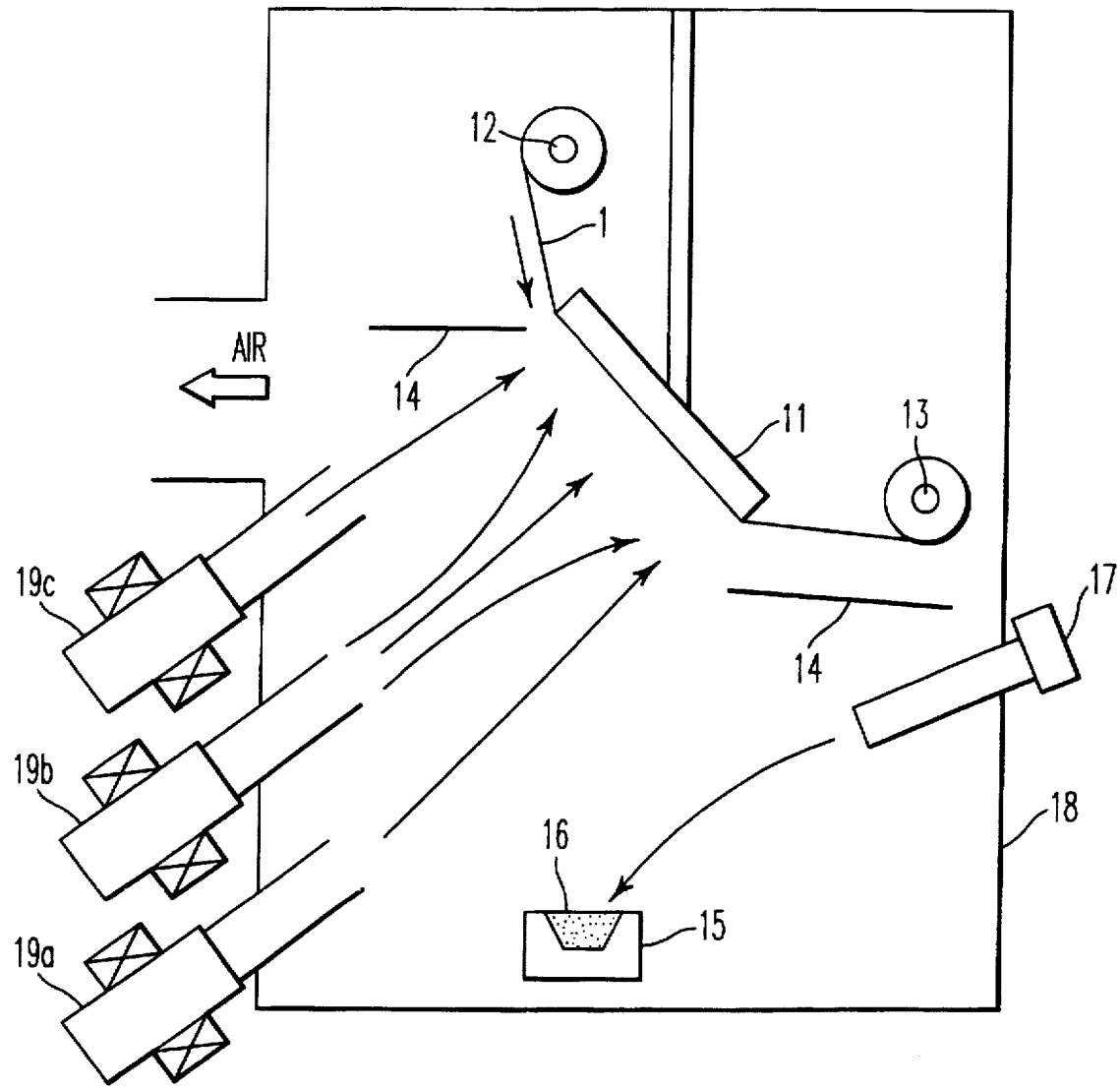
FIG. 5 is a schematic view of a third unit for producing the magnetic layer of the present invention.

The magnetic layer 2 is produced through the unit shown in FIG. 5. Referring to FIG. 5, reference numerals 11, 12, 13, 14, 15 and 16 are a guide member, a supply roll for the substrate 1, a winding roll for the substrate 1, a cover plate, a crucible and an Fe, respectively. The reference numerals 17 and 18 are an electron gun and a vacuum vessel. The reference numerals 19a, 19b and 19c are ion guns. The vacuum vessel 18 is vacuumed to a vacuum degree ranging from $10^{-4}$ to $10^{-6}$ Torr. Then the electron beam is irradiated from the electron gun 17 to the Fe 16. The Fe particles evaporate and adhere to the substrate 1. A minimum incident angle of the depositing Fe particles ranges from 30° to 80° and preferably from 45° to 70°. When the Fe layer is being produced, oxygen ions are irradiated from the ion gun 19a and 19c to both ends of the Fe layer on the guide member 11. Irradiation of the oxygen ions can be replaced by irradiation of the oxygen gas. The carbon ions are irradiated from the ion gun 19b between the 19a and 19c to the whole surface of the Fe layer.

The resultant magnetic layer 2 has the following characteristics.

A1 The magnetic layer 2 is an Fe—C—O magnetic layer.

A2 An upper layer and a lower layer of the magnetic layer 2 have high O concentration areas. A middle layer between the upper layer and the lower layer has a low O concentration area.

The upper layer of the magnetic layer 2 ranges from the uppermost surface of the magnetic layer to the depth $1/7$ of the thickness of the magnetic layer. The lower layer of the magnetic layer 2 ranges from the depth $6/7$ of the thickness of the magnetic layer 2 to the bottom surface of the magnetic layer 2.

A3 The Auger profile of the O/at. % shows peak points in ranges from the start of spattering to $1/7$ of the spattering time and from the $6/7$ of the spattering time to the end of spattering.

A4 A peak value $O_1$ of the O/at. % in the upper layer of the magnetic layer 2 ranges from 10 to 50 at. %, and preferably from 15 to 40 at. %. A peak value $O_2$ of the O/at. % in the lower layer of the magnetic layer 2 ranges from 10 to 50 at. %, and preferably from 15 to 40 at. %.

A5 The peak value $O_1$ ranges from 10 to 50 at. % and preferably from 15 to 40 at. %. The peak value $O_2$ ranges from 10 to 50 at. % and preferably from 15 to 40 at. %. A value $O_3$ of the O/at. % in the middle layer ranges from 5 to 30 at. %, preferably from 5 to 30 at. %. $O_1 > O_3$, $O_2 > O_3$ A6 The Fe concentration becomes low at points corresponding to peak values $O_1$ and $O_2$ of the O concentration.

A7 The C concentration in the middle layer is kept constant.

A8 Each concentration (at/%) of Fe, C and O of the magnetic layer 2 satisfies the following equation [III] and preferably the equation [IIIa].

Equation [III]:

$$50 \text{ at. \%} \leq \text{Fe concentration} \leq 90 \text{ at. \%}$$

$$5 \text{ at. \%} \leq \text{C concentration} \leq 35 \text{ at. \%}$$

$$5 \text{ at. \%} \leq \text{O concentration} \leq 35 \text{ at. \%}$$

Equation [IIIa]:

$$60 \text{ at. \%} \leq \text{Fe concentration} \leq 86 \text{ at. \%}$$

$$7 \text{ at. \%} \leq \text{C concentration} \leq 30 \text{ at. \%}$$

$$7 \text{ at. \%} \leq \text{O concentration} \leq 30 \text{ at. \%}$$

Figure 6:
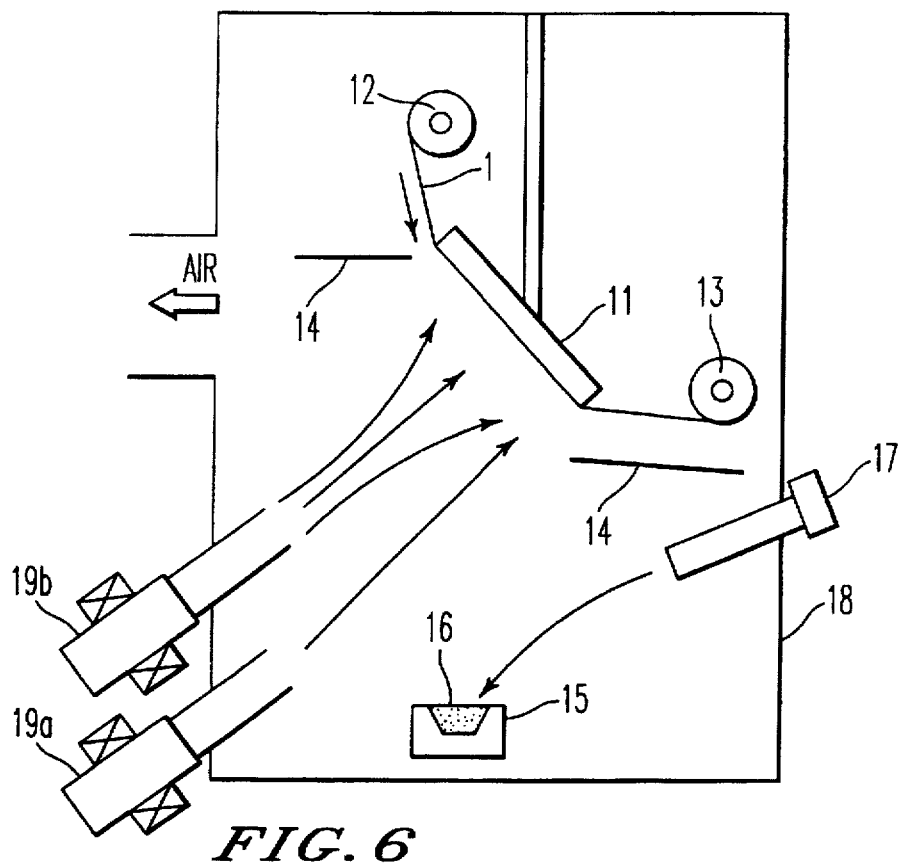
FIG. 6 is a schematic view of a fourth unit for producing the magnetic layer of the present invention.

The magnetic layer 2 is produced through a unit shown in FIG. 6. Referring to FIG. 6, reference numerals 11, 12, 13, 14, 15 and 16 are a guide member, a supply roll for the substrate 1, a winding roll for the substrate 1, a cover plate, a crucible and an Fe, respectively. The reference numerals 17 and 18 are an electron gun and a vacuum vessel, respectively. The reference numerals 19a and 19b are ion guns. The vacuum vessel 18 is vacuumed to a vacuum degree ranging from $10^{-4}$ to $10^{-6}$ Torr. Then the electron beam is irradiated from the electron gun 17 to the Fe 16. The Fe particles evaporate and adhere to the substrate 1. A minimum incident angle of the depositing Fe particles ranges from 30° to 80° and preferably from 45° to 70°. When the Fe layer is being produced, oxygen ions are irradiated from the ion gun 19a to one end of the Fe layer (upper layer of the Fe layer) on the guide member 11. Irradiation of the oxygen ions can be replaced by irradiation of the oxygen gas. Carbon ions are irradiated from the ion gun 19b to the whole surface of the Fe layer.

The resultant magnetic layer 2 has the following characteristics.

B1 The magnetic layer 2 is an Fe—C—O magnetic layer.

B2 The upper layer of the magnetic layer has a high O concentration area. That is a peak value of the O concentration is in the upper layer.

The upper layer of the magnetic layer 2 ranges from the uppermost surface of the magnetic layer to the depth $1/7$ of the thickness thereof. The lower layer of the magnetic layer 2 ranges from the depth 5/7 of the thickness of the magnetic layer to the bottom surface thereof.

B3 The Auger profile of the O concentration shows peak points in a range from the start of spattering to 1/7 of the spattering time.

B4 A peak value $O_1$ of the O concentration in the upper layer of the magnetic layer 2 ranges from 10 to 50 at. %, and preferably from 15 to 40 at. %.

B5 The Fe concentration becomes low at a point corresponding to the peak value $O_1$ of the O concentration.

B6 The C concentration of the middle layer between the upper layer and the lower layer is kept constant.

B7 Each concentration (at. %) of the Fe, C and O satisfies the following equation [III] and particularly an equation [IIIa].

Equation [III]:

50 at. % ≦ Fe concentration ≦ 90 at. %

5 at. % ≦ C concentration ≦ 35 at. %

5 at. % ≦ O concentration ≦ 35 at. %

Equation [IIIa]:

60 at. % ≦ Fe concentration ≦ 80 at. %

10 at. % ≦ C concentration ≦ 25 at. %

10 at. % ≦ O concentration ≦ 25 at. %

EXAMPLE

[Example-1]

An ion assist oblique deposition unit shown in FIG. 3 was used.

A 10 μm thick PET film was used as the substrate 1. The running speed of the PET film 1 was 2 m/min.

The Fe 16 was put into the crucible 15 made of MgO. The electron gun 17 (output: 30 kW) was actuated to evaporate the Fe. Then Fe particles deposited on the PET film 1. The minimum incident angle of the Fe particles was 60°.

Next 52 sccm of methane ($CH_4$) gas was supplied to the ion gun 19 (output: 400 W). Carbon ions were irradiated to the Fe layer on the PET film 1.

Then 11 sccm of oxygen gas ($O_2$) was supplied through the nozzle 20.

Finally 8 mm VTR magnetic tape shown in FIG. 1 was obtained through conventional steps. The magnetic layer 2 had a thickness of 1800 Å, a coercive force Hc of 1350 Oe, a saturated magnetic induction Bs of 5200 G and Br/Bs of 0.82.

The magnetic layer had a oblique column structure shown in FIG. 2.

The magnetic tape was subjected to the measurement of an Auger electron spectroscopic analysis unit (Micro LAB manufactured by VGScience). The measurement conditions are as follows.

Electron gun Accelerating voltage: 10 kV, Emission current: 10 nA, Magnification: ×2000

Etching condition Etching gas: Argon, Accelerating voltage: 3 kV, Ion current: 300 nA, Etching was executed at an interval of 30 seconds, Spatter direction: oblique to the magnetic layer 2 (column 2a)

Figure 7:
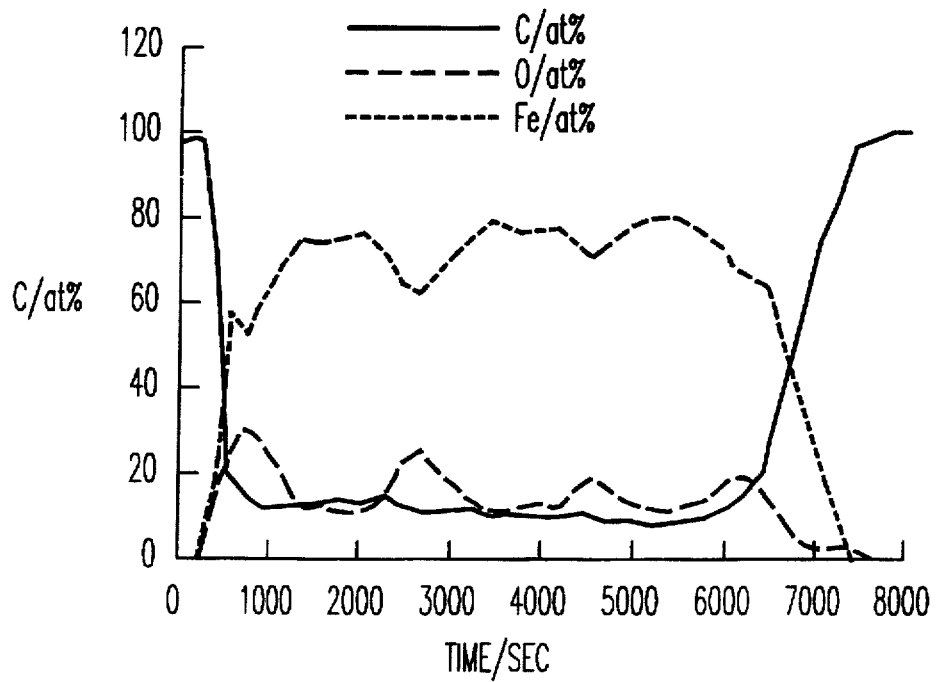
FIG. 7 to FIG. 25 show Auger profiles.

The profile derived from the Auger electron spectroscopic analysis is shown in FIG. 7. The axis of ordinate and the axis of abscissa of the profile are the respective concentration (at/%) of the Fe, C and O (Fe/at. %+C/at. %+O/at. %=100%) and the spattering time, respectively.

The Auger profile of FIG. 7 shows that the protective layer (diamond-like carbon) 3 and the lubricant layer 4 are coated on the magnetic layer 2. Therefore the Auger profile of FIG. 7 only shows the C/at. % at a start of spattering and no Fe/at. % nor O/at. % was detected. The Fe/at. % and O/at. % were detected accompanied with the development of the spattering. It is difficult to define the initial point of the surface of the magnetic layer 2. In this Example-1 using the diamond-like carbon, the interface between the diamond-like carbon layer and the magnetic layer was determined to be at a point where the Fe/at. % and the C/at. % of the Auger profile become equivalent. The interface between the magnetic layer 2 and the substrate 1 was determined to be at a point where the Fe/at. % and the C/at. % of the Auger profile become equivalent.

The Auger profile of FIG. 7 has the following characteristics.

(1) Each concentration of the Fe and the O has a wave pattern.

(2) Each concentration of the Fe and the O has a wave pattern having 5% or more amplitude deviation.

(3) The C concentration profile is considered to be constant.

(4) Peak points of the Fe/at. % profile are correlated with bottom points of the O/at. % profile. Bottom points of the Fe/at. % profile are also correlated with peak points of the O/at. % profile.

(9) The magnetic layer 2 is composed of 68 at. % of Fe, 18 at. % of C and 14 at. % of O, respectively.

[Example-2]

The same way as Example-1 was done except that supply amounts of $CH_4$ and $O_2$ were 45 sccm and 10 sccm, respectively. The 8 mm VTR magnetic tape shown in FIG. 1 was obtained.

The magnetic layer 2 has a thickness of 1900 Å, a coercive force Hc of 1290 Oe, a saturated magnetic induction Bs of 5900 G and Br/Bs of 0.83.

The magnetic layer had a oblique column structure shown in FIG. 2.

The magnetic tape was subjected to the measurement of an Auger electron spectroscopic analysis unit (Micro LAB manufactured by VGScience). The measurement conditions are the same as the Example-1.

Figure 8:
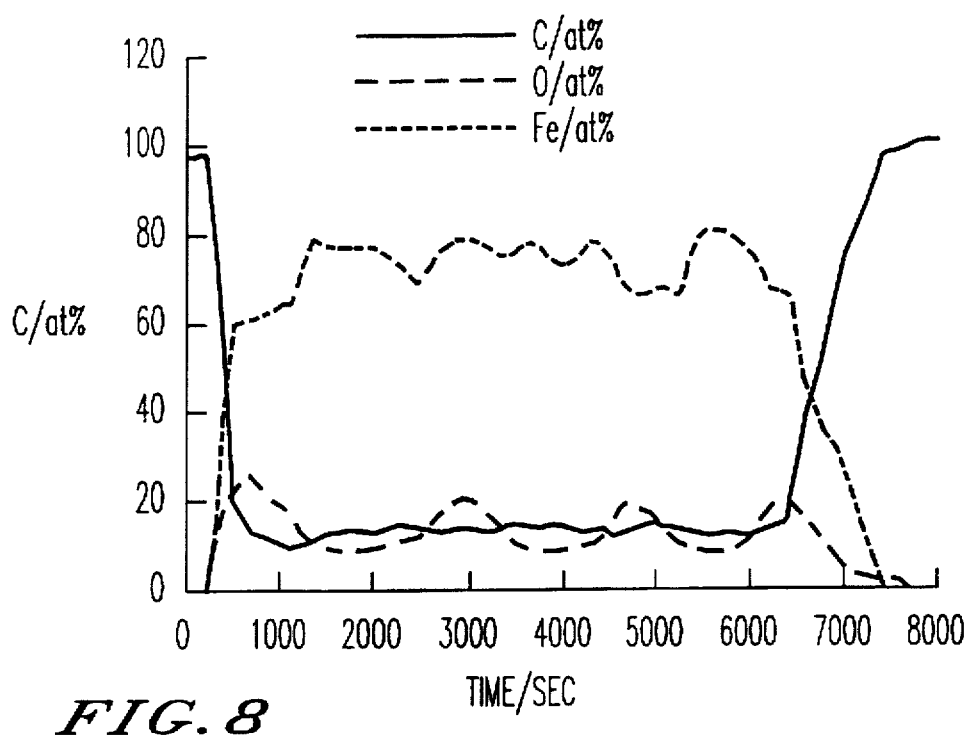

The profile derived from the Auger electron spectroscopic analysis is shown in FIG. 8.

The Auger profile of FIG. 8 has the following characteristics.

(1) Each concentration of the Fe and the O has a wave pattern.

(2) Each concentration of the Fe and the O has a wave pattern having 5% or more amplitude deviation.

(3) The C concentration profile is considered to be constant.

(4) Peak points of the Fe/at. % profile are correlated with bottom points of the O at/% profile. Bottom points of the Fe/at. % profile are also correlated with peak points of the O/at. % profile.

(9) The magnetic layer 2 is composed of 74 at. % of Fe, 13 at. % of C and 13 at. % of O, respectively.

[Example-3]

The same way as Example-1 was done except that supply amounts of $CH_4$ and $O_2$ were 25 sccm and 25 sccm, respectively. The 8 mm VTR magnetic tape shown in FIG. 1 was obtained.

The magnetic layer 2 has a thickness of 3400 Å, a coercive force Hc of 1510 Oe, a saturated magnetic induction Bs of 4800 G and Br/Bs of 0.91.

The magnetic layer 2 had a oblique column structure shown in FIG. 2.

The magnetic tape was subjected to the measurement of an Auger electron spectroscopic analysis unit. The measurement conditions were the same as the Example-1.

Figure 9:
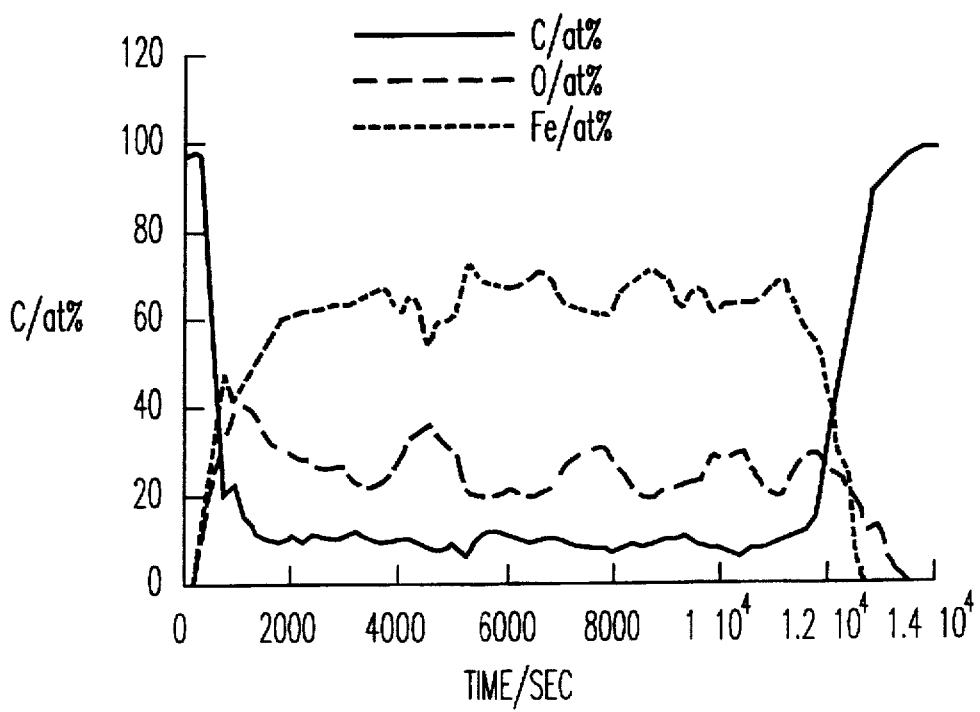

The profile derived from the Auger electron spectroscopic analysis is shown in FIG. 9.

The Auger profile of FIG. 9 has the following characteristics.

(1) Each concentration of the Fe and the O has a wave pattern.

(2) Each concentration of the Fe and the O has a wave pattern having 5% or more amplitude deviation.

(3) The C concentration profile is considered to be constant.

(4) Peak points of the Fe/at. % profile are correlated with bottom points of the O/at. % profile. Bottom points of the Fe/at. % profile are also correlated with peak points of the O/at. % profile.

(9) The magnetic layer 2 is composed of 60 at. % of Fe, 10 at. % of C and 30 at. % of O, respectively.

[Example-4]

The same way as Example-1 was done except that supply amounts of $CH_4$ and $O_2$ were 30 sccm and 15 sccm, respectively. The 8 mm VTR magnetic tape shown in FIG. 1 was obtained.

The magnetic layer 2 has a thickness of 2300 Å, a coercive force Hc of 1420 Oe, a saturated magnetic induction Bs of 5000 G and Br/Bs of 0.85.

The magnetic layer 2 had a oblique column structure shown in FIG. 2.

The magnetic tape was subjected to the measurement of an Auger electron spectroscopic analysis unit. The measurement conditions were the same as the Example-1.

Figure 10:
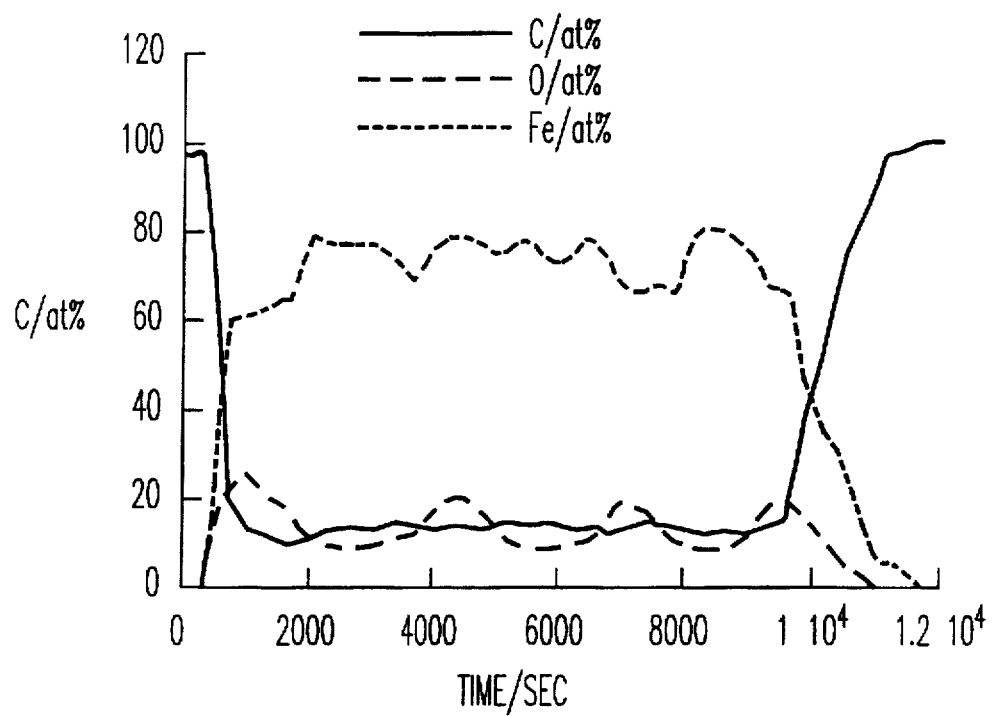

The profile derived from the Auger electron spectroscopic analysis is shown in FIG. 10.

The Auger profile of FIG. 10 has the following characteristics.

(1) Each concentration of the Fe and the O has a wave pattern.

(2) Each concentration of the Fe and the O has a wave pattern having 5% or more amplitude deviation.

(3) The C concentration profile is considered to be constant.

(4) Peak points of the Fe/at. % profile are correlated with bottom points of the O/at. % profile. Bottom points of the Fe/at. % profile are also correlated with peak points of the O/at. % profile.

(9) The magnetic layer 2 is composed of 65 at. % of Fe, 20 at. % of C and 15 at. % of O, respectively.

[Example-5]

An ion assist oblique deposition unit shown in FIG. 4 was used.

A 10 μm thick PET film was used as the substrate 1. The running speed of the PET film 1 was 2 m/min.

The crucible 15 made of MgO contained the Fe 16. The electron gun 17 (output: 30 kW) was actuated to evaporate the Fe. Then Fe particles deposited on the PET film 1. The minimum incident angle of the Fe particles was 65°.

Next 50 sccm of $CH_4$ and 10 sccm of $O_2$ were supplied to the ion gun 19 (output: 400 W). Carbon ions and oxygen ions were irradiated to the Fe layer on the PET film 1.

Finally 8 mm VTR magnetic tape shown in FIG. 1 was obtained through conventional steps. The magnetic layer 2 has a thickness of 1850 Å, a coercive force Hc of 1400 Oe, a saturated magnetic induction Bs of 5300 G and Br/Bs of 0.86.

The magnetic layer had a oblique column structure shown in FIG. 2.

The magnetic tape was subjected to the measurement of an Auger electron spectroscopic analysis unit. The measurement conditions were the same as the Example-1.

Figure 11:
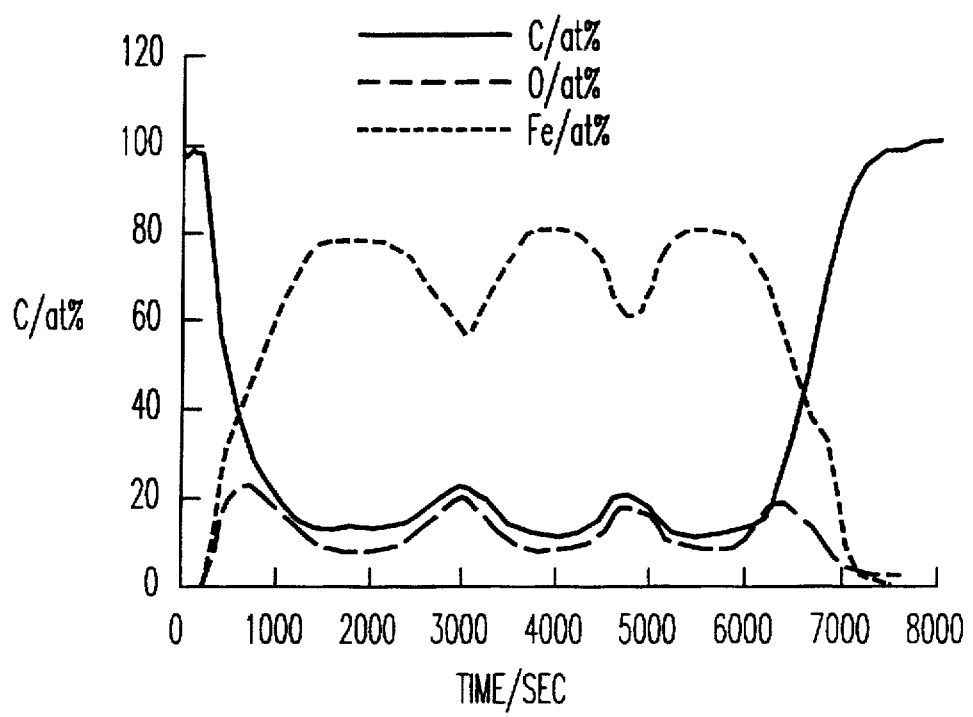

The profile derived from the Auger electron spectroscopic analysis is shown in FIG. 11.

The Auger profile of FIG. 11 has the following characteristics.

(5) Each concentration (at. %) of the Fe, C and O has a wave pattern.

(6) Each concentration (at. %) of the Fe, C and O has a wave pattern having 5% or more amplitude deviation.

(7) Peak points of the Fe/at. % profile are correlated with bottom points of the C/at. % profile. Peak points of the Fe/at. % profile are correlated with bottom points of the O/at. % profile. Bottom points of the Fe/at. % profile are also correlated with peak points of the C/at. % profile. Bottom points of the Fe/at. % profile are correlated with peak points of the O/at. % profile.

(9) The magnetic layer 2 is composed of 72 at. % of Fe, 16 at. % of C and 12 at. % of O, respectively.

[Example-6]

The same way as Example-5 was done except that supply amounts of $CH_4$ and $O_2$ were set to 40 sccm and 6 sccm, respectively. The 8 mm VTR magnetic tape shown in FIG. 1 was obtained.

The magnetic layer 2 has a thickness of 1800 Å, a coercive force Hc of 1240 Oe, a saturated magnetic induction Bs of 6100 G and Br/Bs of 0.80.

The magnetic layer 2 had a oblique column structure shown in FIG. 2.

The magnetic tape was subjected to the measurement of an Auger electron spectroscopic analysis unit. The measurement conditions were the same as the Example-1.

Figure 12:
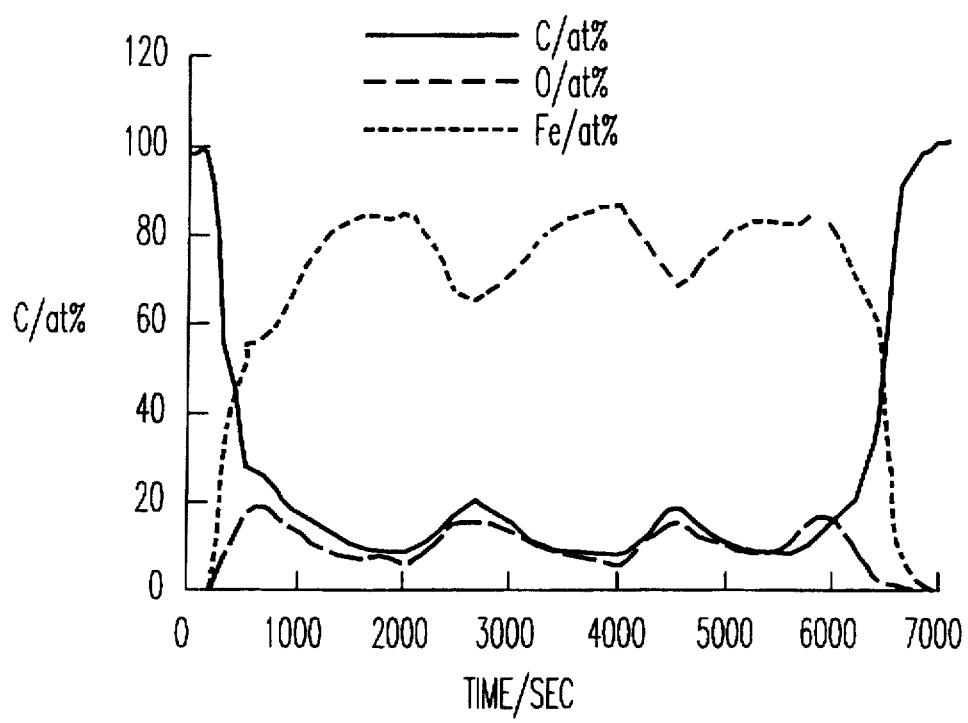

The profile derived from the Auger electron spectroscopic analysis is shown in FIG. 12.

The Auger profile of FIG. 12 has the following characteristics.

(5) Each concentration of the Fe, C and O has a wave pattern.

(6) Each concentration of the Fe, C and O has a wave pattern having 5% or more amplitude deviation.

(7) Peak points of the Fe/at. % profile are correlated with bottom points of the C/at. % profile. Peak points of the Fe/at. % profile are correlated with bottom points of the O/at. % profile. Bottom points of the Fe/at. % profile are also correlated with peak points of the C/at. % profile. Bottom points of the Fe/at. % profile are correlated with peak points of the O/at. % profile.

(9) The magnetic layer 2 is composed of 80 at. % of Fe, 12 at. % of C and 8 at. % of O, respectively.

[Example-7]

The same way as Example-5 was done except that supply amounts of $CH_4$ and $O_2$ were set to 70 sccm and 15 sccm, respectively. The 8 mm VTR magnetic tape shown in FIG. 1 was obtained.

The magnetic layer 2 has a thickness of 2700 Å, a coercive force Hc of 1450 Oe, a saturated magnetic induction Bs of 4900 G and Br/Bs of 0.90.

The magnetic layer 2 had a oblique column structure shown in FIG. 2.

The magnetic tape was subjected to the measurement of an Auger electron spectroscopic analysis unit. The measurement conditions were the same the Example-1.

Figure 13:
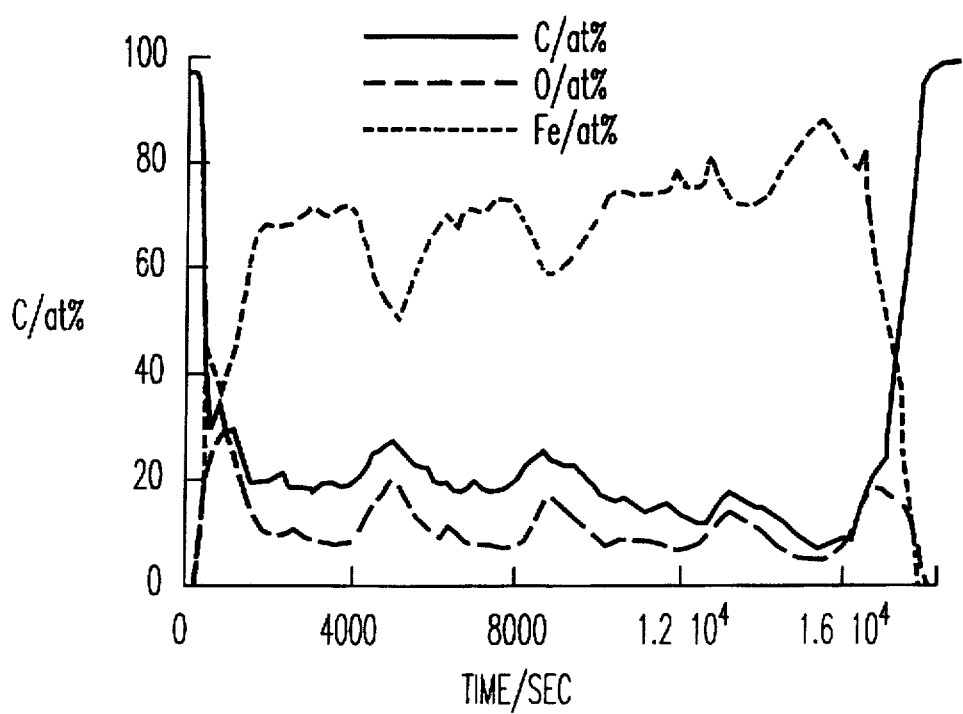

The profile derived from the Auger electron spectroscopic analysis is shown in FIG. 13.

The Auger profile of FIG. 13 has the following characteristics.

(5) Each concentration of the Fe, C and O has a wave pattern.

(6) Each concentration of the Fe, C and O has a wave pattern having 5% or more amplitude deviation.

(7) Peak points of the Fe/at. % profile are correlated with bottom points of the C/at. % profile. Peak points of the Fe/at. % profile are correlated with bottom points of the O/at. % profile. Bottom points of the Fe/at. % profile are also correlated with peak points of the C/at. % profile. Bottom points of the Fe/at. % profile are correlated with peak points of the O/at. % profile.

(9) The magnetic layer 2 is composed of 65 at. % of Fe, 20 at % of C and 15 at. % of O, respectively.

[Example-8]

The same way as Example-5 was done except that supply amounts of $CH_4$ and $O_2$ were 25 sccm and 12 sccm, respectively. The 8 mm VTR magnetic tape shown in FIG. 1 was obtained.

The magnetic layer 2 has a thickness of 2600 Å, a coercive force Hc of 1290 Oe, a saturated magnetic induction Bs of 5850 G and Br/Bs of 0.82.

The magnetic layer 2 had a oblique column structure shown in FIG. 2.

The magnetic tape was subjected to the measurement of an Auger electron spectroscopic analysis unit. The measurement conditions were the same as the Example-1.

Figure 14:
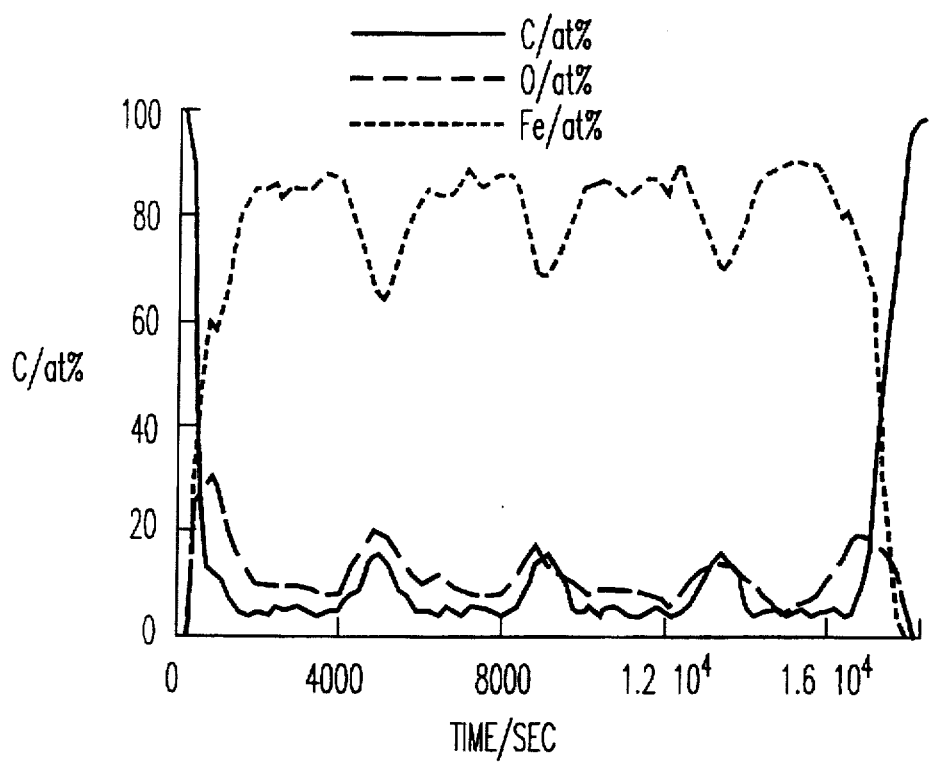

The profile derived from the Auger electron spectroscopic analysis is shown in FIG. 14.

The Auger profile of FIG. 14 has the following characteristics.

(5) Each concentration of the Fe, C and O has a wave pattern.

(6) Each concentration of the Fe, C and O has a wave pattern having 5% or more amplitude deviation.

(7) Peak points of the Fe/at. % profile are correlated with bottom points of the C/at. % profile. Peak points of the Fe/at. % profile are correlated with bottom points of the O/at. % profile. Bottom points of the Fe/at. % profile are also correlated with peak points of the C/at. % profile. Bottom points of the Fe/at. % profile are correlated with peak points of the O/at. % profile.

(9) The magnetic layer 2 is composed of 80 at. % of Fe, 12 at. % of C and 8 at. % of O, respectively.

[Comparison-1]

The same way as Example-1 was done except that supply amounts of $CH_4$ to the ion gun 19 and $O_2$ to the nozzle 20 set at a changed position were 50 sccm and 20 sccm, respectively. The 8 mm VTR magnetic tape shown in FIG. 1 was obtained.

The magnetic layer 2 has a thickness of 1600 Å, a coercive force Hc of 1320 Oe, a saturated magnetic induction Bs of 4700 G and Br/Bs of 0.83.

The magnetic layer 2 had a oblique column structure shown in FIG. 2.

The magnetic tape was subjected to the measurement of an Auger electron spectroscopic analysis unit. The measurement conditions were the same as the Example-1.

Figure 15:
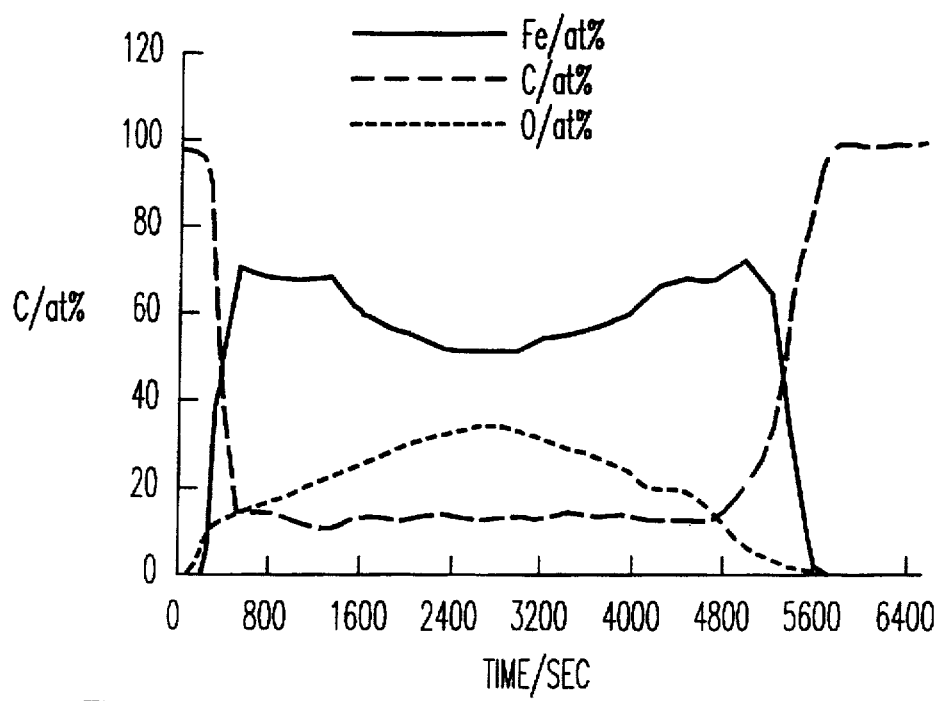

The profile derived from the Auger electron spectroscopic analysis is shown in FIG. 15.

The magnetic layer 2 is composed of 61 at. % of Fe, 14 at. % of C and 25 at. % of O, respectively.

[Characteristics]

Each magnetic tape obtained from the respective examples and a comparison was loaded in a cassette. The cassette was set in a VTR connected to a noise meter so as to measure the respective S/Ns. The measurement results are shown in Table-1.

TABLE 1

|  | Y-S/N (dB) | C-S/N (dB) | |
|---|---|---|---|
|  |  | AM | PM |
| E-1 | +1.2 | +1.1 | +1.2 |
| E-2 | +0.8 | +1.5 | +1.3 |
| E-3 | +1.9 | +1.0 | +0.9 |
| E-4 | +1.3 | +0.8 | +1.1 |
| E-5 | +1.5 | +1.5 | +1.4 |
| E-6 | +0.8 | +2.1 | +1.9 |
| E-7 | +1.9 | +1.4 | +1.7 |
| E-8 | +0.6 | +2.2 | +2.1 |
| C-1 | 0 | 0 | 0 |

*The comparison-1 was set as a reference (0 dB)

The corrosion resistance and durability of the magnetic tape obtained from the examples and a comparison were measured. The measurement results are shown in Table-2.

TABLE 2

|  | Corrosion resistance (%) | Durability (%) |
|---|---|---|
| E-1 | −5 | −0.5 |
| E-2 | −7 | −0.7 |
| E-3 | −4 | −0.5 |
| E-4 | −4 | −0.4 |
| E-5 | −4 | −0.5 |
| E-6 | −6 | −0.7 |
| E-7 | −2 | −0.3 |
| E-8 | −8 | −0.9 |
| C-1 | −5 | −1.2 |

*corrosion resistance: defined by the decrease in the saturated magnetic induction after leaving the magnetic tape under 90% RH condition at 60° C. for one week.
*durability (still durability): defined by the decrease in 5 MHz output after still reproduction for 5 hours.

[Example-9]

An ion assist oblique deposition unit shown in FIG. 5 was used.

A 6.5 μm thick PET film was used as the substrate 1. The running speed of the PET film 1 was 2 m/min.

The crucible 15 made of MgO contained the Fe 16. The electron gun 17 (output: 30 kW) was actuated to evaporate the Fe. Then Fe particles deposited on the PET film 1. The minimum incident angle of the Fe particles was 55°.

Next 50 sccm of $CH_4$ was supplied to the ion gun 19b (output: 400 W), 8 sccm of $O_2$ was supplied to the ion gun 19c (output: 400 W) and 10 sccm of $O_2$ was supplied to the ion gun 19a, respectively. Carbon ions and oxygen ions were irradiated to the Fe layer on the PET film 1.

Finally 8 mm VTR magnetic tape shown in FIG. 1 was obtained through conventional steps. The magnetic layer 2 had a thickness of 2000 Å, a coercive force Hc of 1380 Oe, a saturated magnetic induction Bs of 5300 G and Br/Bs of 0.84.

The magnetic layer had a oblique column structure shown in FIG. 2.

The magnetic tape was subjected to the measurement of an Auger electron spectroscopic analysis unit. The measurement conditions were the same as the Example-1.

Figure 16:
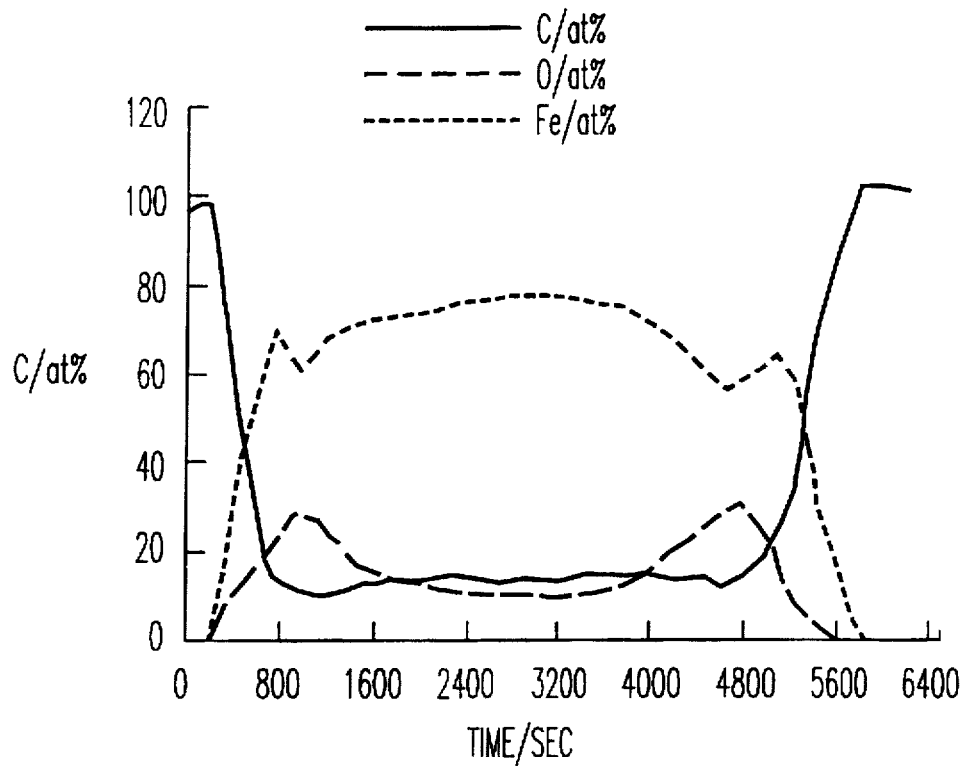

The profile derived from the Auger electron spectroscopic analysis is shown in FIG. 16.

The Auger profile of FIG. 16 has the following characteristics.

A1 The magnetic layer 2 is an Fe—C—O magnetic layer.
A2 Each of the upper layer and lower layer of the magnetic layer 2 has the area where the O concentration is high. The O concentration in the middle layer between the upper layer and lower layer is low.
A5 $O_1$=28 at. %, $O_2$=29 at. %, $O_3$=10 to 12 at. %
A6 The Fe concentration becomes low at the points corresponding to the $O_1$ and $O_2$.
A7 The C concentration in the middle layer is kept constant.
A8 The magnetic layer 2 is composed of 76 at. % of Fe, 14 at. % of C and 16 at. % of O, respectively.

[Example-10]

The same way as Example-9 was done except that supply amounts of $CH_4$ to the ion gun 19b, $O_2$ to the ion gun 19c and $O_2$ to the ion gun 19a were 30 sccm, 15 sccm and 20 sccm, respectively. The 8 mm VTR magnetic tape shown in FIG. 1 was obtained.

The magnetic layer 2 has a thickness of 2200 Å, a coercive force Hc of 1450 Oe, a saturated magnetic induction Bs of 5000 G and Br/Bs of 0.86.

The magnetic layer 2 had a oblique column structure shown in FIG. 2.

The magnetic tape was subjected to the measurement of an Auger electron spectroscopic analysis unit. The measurement conditions were the same as the Example-1.

Figure 17:
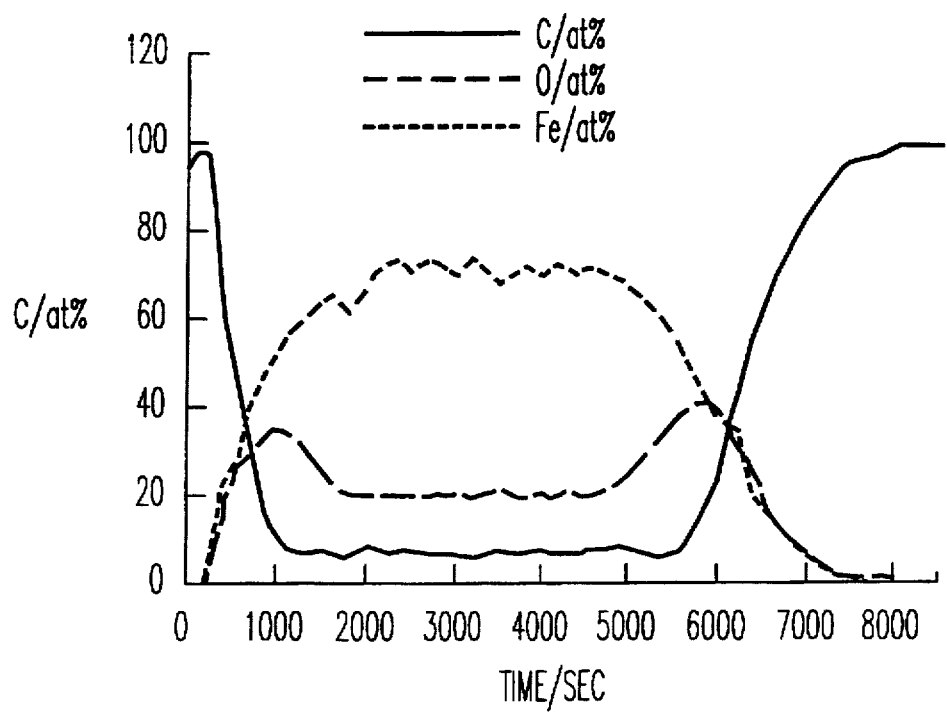

The profile derived from the Auger electron spectroscopic analysis is shown in FIG. 17.

The Auger profile of FIG. 17 has the following characteristics.

A1 The magnetic layer 2 is an Fe—C—O magnetic layer.
A2 Each of the upper layer and lower layer of the magnetic layer 2 has the area where the O concentration is high. The O concentration in the middle layer between the upper layer and lower layer is low.
A5 $O_1$=35 at. %, $O_2$=41 at. %, $O_3$=20 to 23 at. %
A6 The Fe concentration becomes low at the points corresponding to the $O_1$ and $O_2$.
A7 The C concentration in the middle layer is kept constant.
A8 The magnetic layer 2 is composed of 67 at. % of Fe, 8 at. % of C and 25 at. % of O, respectively.

[Example-11]

The same way as Example-9 was done except that supply amounts of $CH_4$ to the ion gun 19b, $O_2$ to the ion gun 19c and $O_2$ to the ion gun 19a were 120 sccm, 4 sccm and 6 sccm, respectively. The 8 mm VTR magnetic tape shown in FIG. 1 was obtained.

The magnetic layer 2 has a thickness of 3900 Å, a coercive force Hc of 1590 Oe, a saturated magnetic induction Bs of 4600 G and Br/Bs of 0.88.

The magnetic layer 2 had a oblique column structure shown in FIG. 2.

The magnetic tape was subjected to the measurement of an Auger electron spectroscopic analysis unit. The measurement conditions were the same as the Example-1.

Figure 18:
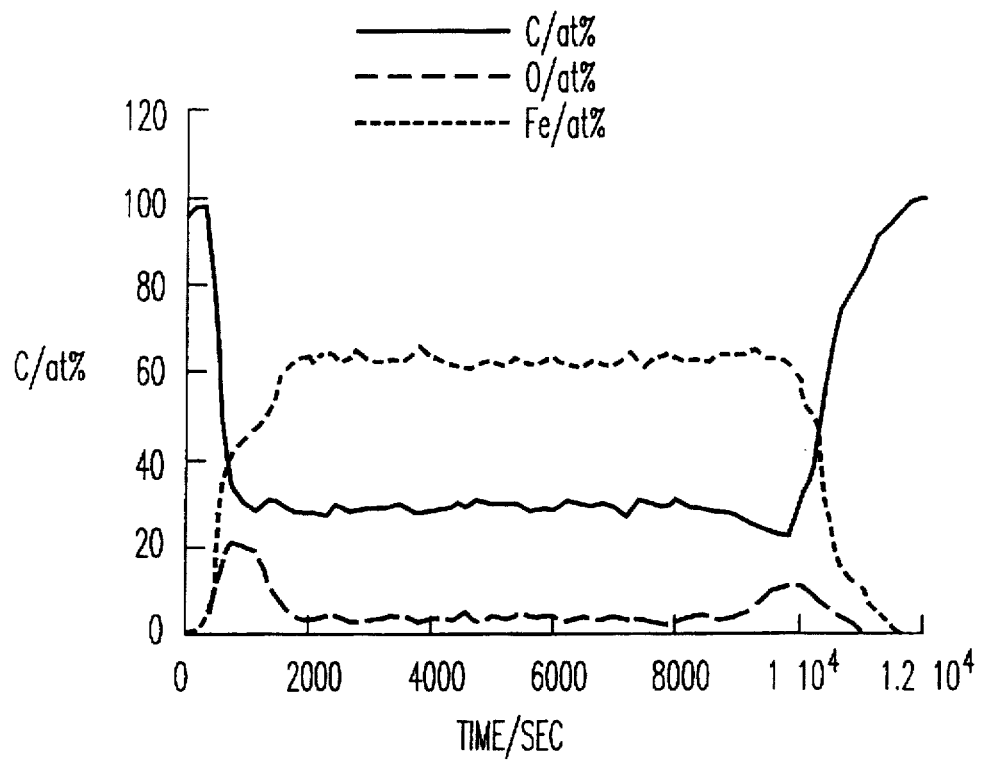

The profile derived from the Auger electron spectroscopic analysis is shown in FIG. 18.

The Auger profile of FIG. 18 has the following characteristics.

A1 The magnetic layer 2 is an Fe—C—O magnetic layer.
A2 Each of the upper layer and lower layer of the magnetic layer 2 has the area where the O concentration is high. The O concentration in the middle layer between the upper layer and lower layer is low.
A5 $O_1$=23 at. %, $O_2$=14 at. %, $O_3$=5 at. %
A6 The Fe concentration becomes low at the points corresponding to the $O_1$ and $O_2$.
A7 The C concentration in the middle layer is kept constant.
A8 The magnetic layer 2 is composed of 60 at. % of Fe, 33 at. % of C and 7 at. % of O, respectively.

[Example-12]

The same way as Example-9 was done except that supply amounts of $CH_4$ to the ion gun 19b, $O_2$ to the ion gun 19c and $O_2$ to the ion gun 19a were 60 sccm, 20 sccm and 30 sccm, respectively. The 8 mm VTR magnetic tape shown in FIG. 1 was obtained.

The magnetic layer 2 has a thickness of 1600 Å, a coercive force Hc of 1610 Oe, a saturated magnetic induction Bs of 4100 G and Br/Bs of 0.88.

The magnetic layer 2 had a oblique column structure shown in FIG. 2.

The magnetic tape was subjected to the measurement of an Auger electron spectroscopic analysis unit. The measurement conditions were the same as the Example-1.

Figure 19:
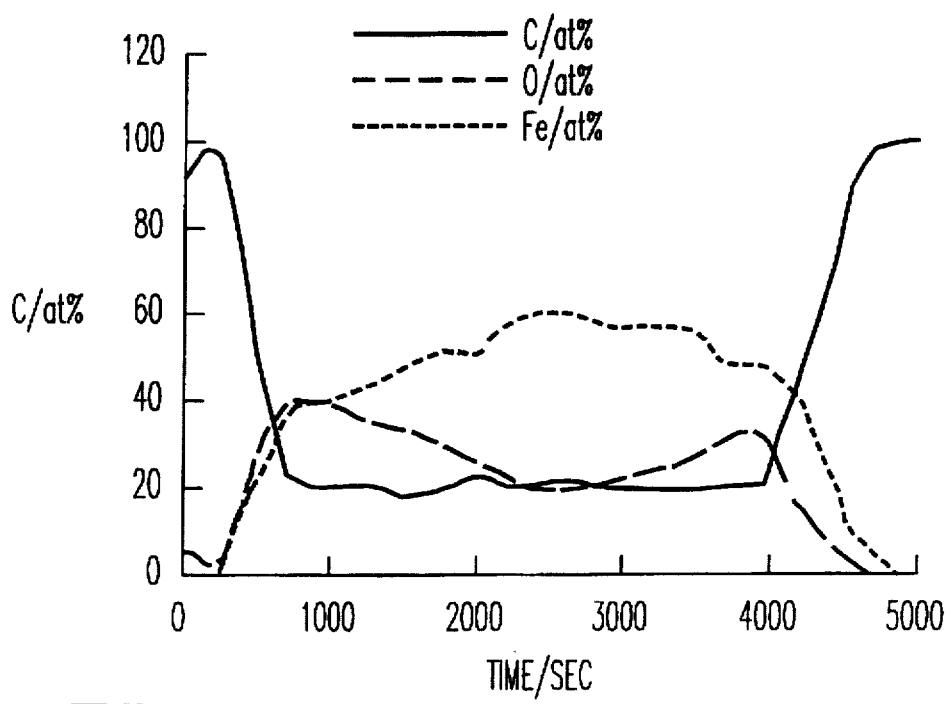

The profile derived from the Auger electron spectroscopic analysis is shown in FIG. 19.

The Auger profile of FIG. 19 has the following characteristics.

A1 The magnetic layer 2 is an Fe—C—O magnetic layer.
A2 Each of the upper layer and lower layer of the magnetic layer 2 has the area where the O concentration is high. The O concentration in the middle layer between the upper layer and lower layer is low.
A5 $O_1$=41 at. %, $O_2$=33 at. %, $O_3$=19 to 26 at. %
A6 The Fe concentration becomes low at the points corresponding to the $O_1$ and $O_2$.
A7 The C concentration in the middle layer is kept constant.

A8 The magnetic layer 2 is composed of 50 at. % of Fe, 20 at. % of C and 30 at. % of O, respectively.

[Comparison-2]

The same way as Example-9 was done except that supply amounts of $CH_4$ to the ion gun 19b, $O_2$ to the ion gun 19c with the orientation changed and $O_2$ to the ion gun 19a with the orientation changed were 50 sccm, 5 sccm and 7 sccm, respectively. The 8 mm VTR magnetic tape shown in FIG. 1 was obtained.

The magnetic layer 2 had a thickness of 2000 Å, a coercive force Hc of 1340 Oe, a saturated magnetic induction Bs of 5200 G and Br/Bs of 0.82.

The magnetic layer 2 had a oblique column structure shown in FIG. 2.

The magnetic tape was subjected to the measurement of an Auger electron spectroscopic analysis unit. The measurement conditions were the same as the Example-1.

Figure 20:
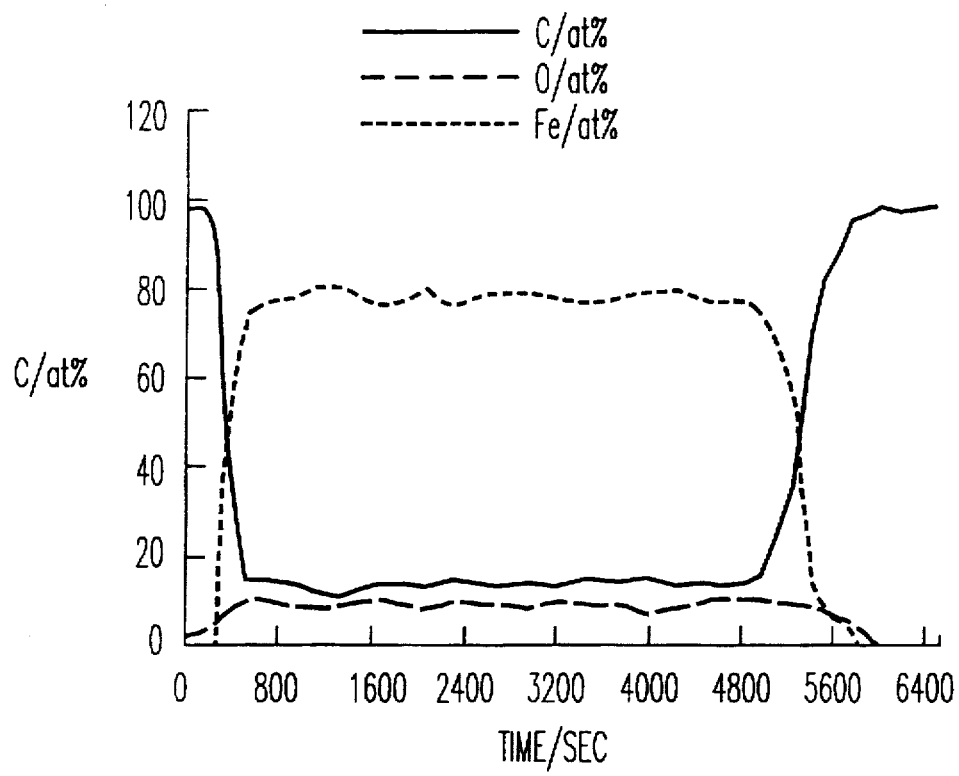

The profile derived from the Auger electron spectroscopic analysis is shown in FIG. 20.

The Auger profile of FIG. 20 has the following characteristics.

The magnetic layer 2 was composed of 74 at. % of Fe, 15 at. % of C and 11 at. % of O, respectively.

[Characteristics]

Each magnetic tape obtained from Example-9 to Example-12 and a Comparison-2 was subjected to the corrosion resistance and durability measurements. The measurement results are shown in Table-3.

TABLE 3

|  | Corrosion resistance (%) | Durability (%) |
| --- | --- | --- |
| E-9 | −6 | −0.5 |
| E-10 | −5 | −0.3 |
| E-11 | −9 | −0.9 |
| E-12 | −4 | −0.2 |
| C-2 | −12 | −1.1 |

*corrosion resistance: Each magnetic tape was dipped in pH 4.8 water solution for 24 hours. The corrosion resistance was defined by the decrease in the saturated magnetic induction.
*durability (still durability): defined by the decrease in output after still reproduction for 5 hours.

[Example-13]

An ion assist oblique deposition unit shown in FIG. 6 was used.

A 10 μm thick PET film was used as the substrate 1. The running speed of the PET film 1 was 2 m/min.

The crucible 15 made of MgO contained the Fe 16. The electron gun 17 (output: 30 kW) was actuated to evaporate the Fe. Then Fe particles deposited on the PET film 1. The minimum incident angle of the Fe particles was 50°.

Next 50 sccm of $CH_4$ was supplied to the ion gun 19b (output: 400 W) and 10 sccm of $O_2$ was supplied to the ion gun 19a (output: 400 W), respectively. Carbon ions and oxygen ions were irradiated to the Fe layer on the PET film 1.

Finally 8 mm VTR magnetic tape shown in FIG. 1 was obtained through conventional steps. The magnetic layer 2 had a thickness of 1450 Å, a coercive force Hc of 1260 Oe, a saturated magnetic induction Bs of 5800 G and Br/Bs of 0.82.

The magnetic layer had a oblique column structure shown in FIG. 2.

The magnetic tape was subjected to the measurement of an Auger electron spectroscopic analysis unit. The measurement conditions were the same as the Example-1.

Figure 21:
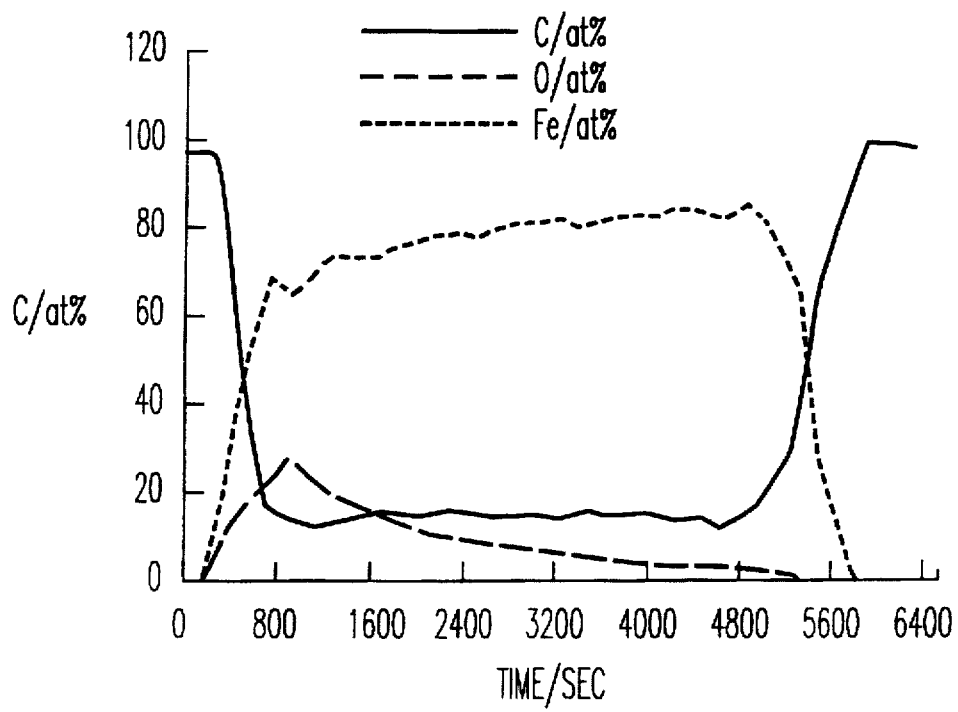

The profile derived from the Auger electron spectroscopic analysis is shown in FIG. 21.

The Auger profile of FIG. 21 has the following characteristics.

B1 The magnetic layer 2 is an Fe—C—O magnetic layer.

B2 The upper layer of the magnetic layer 2 has the area where the O concentration is high, presenting the pattern having a peak value of the O concentration in the upper layer.

B4 $O_1$=25 at. %

B5 The Fe concentration becomes low at the point corresponding to the $O_1$.

B6 The C concentration in the middle layer between the upper layer and the lower layer is kept constant.

B7 The magnetic layer 2 is composed of 78 at. % of Fe, 14 at. % of C and 8 at. % of O, respectively.

[Example-14]

The same way as Example-13 was done except that supply amounts of $CH_4$ to the ion gun 19b and $O_2$ to the ion gun 19a were 25 sccm and 30 sccm, respectively. The 8 mm VTR magnetic tape shown in FIG. 1 was obtained.

The magnetic layer 2 had a thickness of 1250 Å, a coercive force Hc of 1420 Oe, a saturated magnetic induction Bs of 5200 G and Br/Bs of 0.86.

The magnetic layer 2 had a oblique column structure shown in FIG. 2.

The magnetic tape was subjected to the measurement of an Auger electron spectroscopic analysis unit. The measurement conditions were the same as the Example-1.

Figure 22:
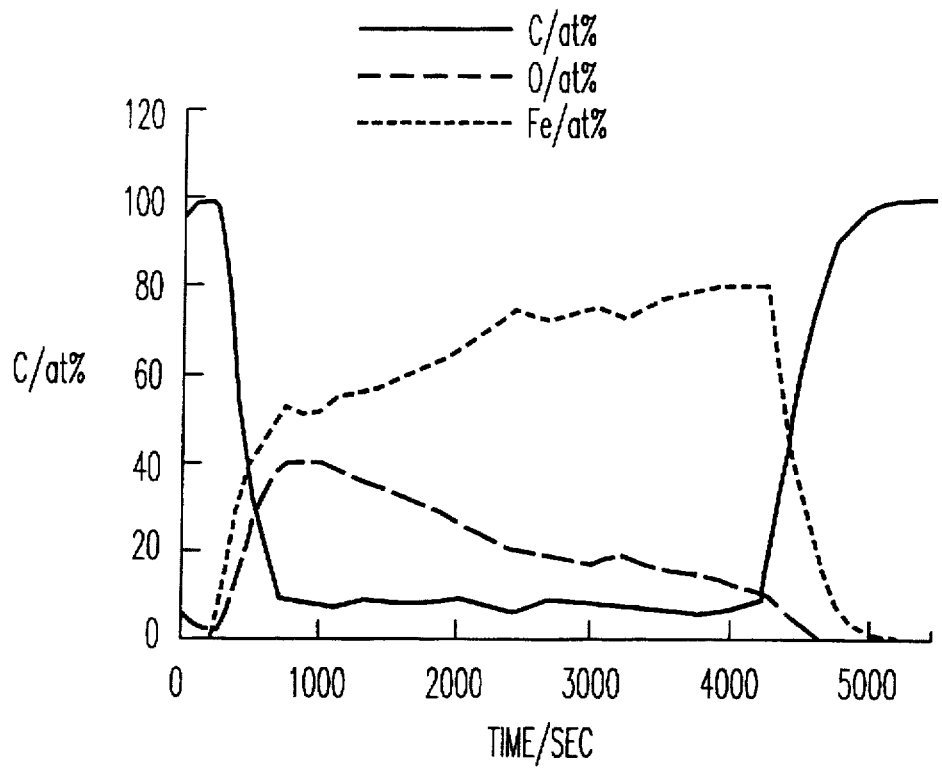

The profile derived from the Auger electron spectroscopic analysis is shown in FIG. 22.

The Auger profile of FIG. 22 has the following characteristics.

B1 The magnetic layer 2 is an Fe—C—O magnetic layer.

B2 The upper layer of the magnetic layer 2 has the area where the O concentration is high, presenting the pattern having a peak value of the O concentration in the upper layer.

B4 $O_1$=40 at. %

B5 The Fe concentration becomes low at the point corresponding to the $O_1$.

B6 The C concentration in the middle layer between the upper layer and the lower layer is kept constant.

B7 The magnetic layer 2 is composed of 68 at. % of Fe, 7 at. % of C and 25 at. % of O, respectively.

[Example-15]

The same way as Example-13 was done except that supply amounts of $CH_4$ to the ion gun 19b and $O_2$ to the ion gun 19a were 55 sccm and 14 sccm, respectively. The 8 mm VTR magnetic tape shown in FIG. 1 was obtained.

The magnetic layer 2 had a thickness of 1900 Å, a coercive force Hc of 1370 Oe, a saturated magnetic induction Bs of 5500 G and Br/Bs of 0.83.

The magnetic layer 2 had a oblique column structure shown in FIG. 2.

The magnetic tape was subjected to the measurement of an Auger electron spectroscopic analysis unit. The measurement conditions were the same as the Example-1.

Figure 23:
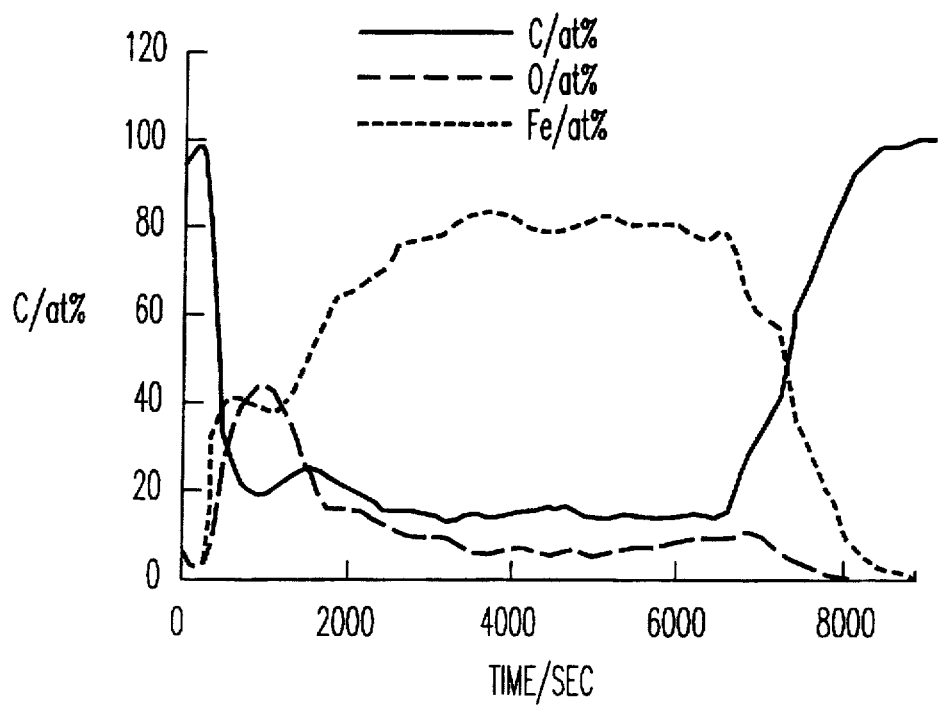

The profile derived from the Auger electron spectroscopic analysis is shown in FIG. 23.

The Auger profile of FIG. 23 has the following characteristics.

B1 The magnetic layer 2 is an Fe—C—O magnetic layer.

B2 The upper layer of the magnetic layer 2 has the area where the O concentration is high, presenting the pattern having a peak value of the O concentration in the upper layer.

B4 $O_1$=44 at. %

B5 The Fe concentration becomes low at the point corresponding to the $O_1$.

B6 The C concentration in the middle layer between the upper layer and the lower layer is kept constant.

B7 The magnetic layer 2 is composed of 75 at. % of Fe, 15 at. % of C and 10 at. % of O, respectively.

[Example-16]

The same way as Example-13 was done except that supply amounts of $CH_4$ to the ion gun 19b and $O_2$ to the ion gun 19a were 90 sccm and 10 sccm, respectively. The 8 mm VTR magnetic tape shown in FIG. 1 was obtained.

The magnetic layer 2 had a thickness of 1800 Å, a coercive force Hc of 1400 Oe, a saturated magnetic induction Bs of 5000 G and Br/Bs of 0.84.

The magnetic layer 2 had a oblique column structure shown in FIG. 2.

The magnetic tape was subjected to the measurement of an Auger electron spectroscopic analysis unit. The measurement conditions were the same as the Example-1.

Figure 24:
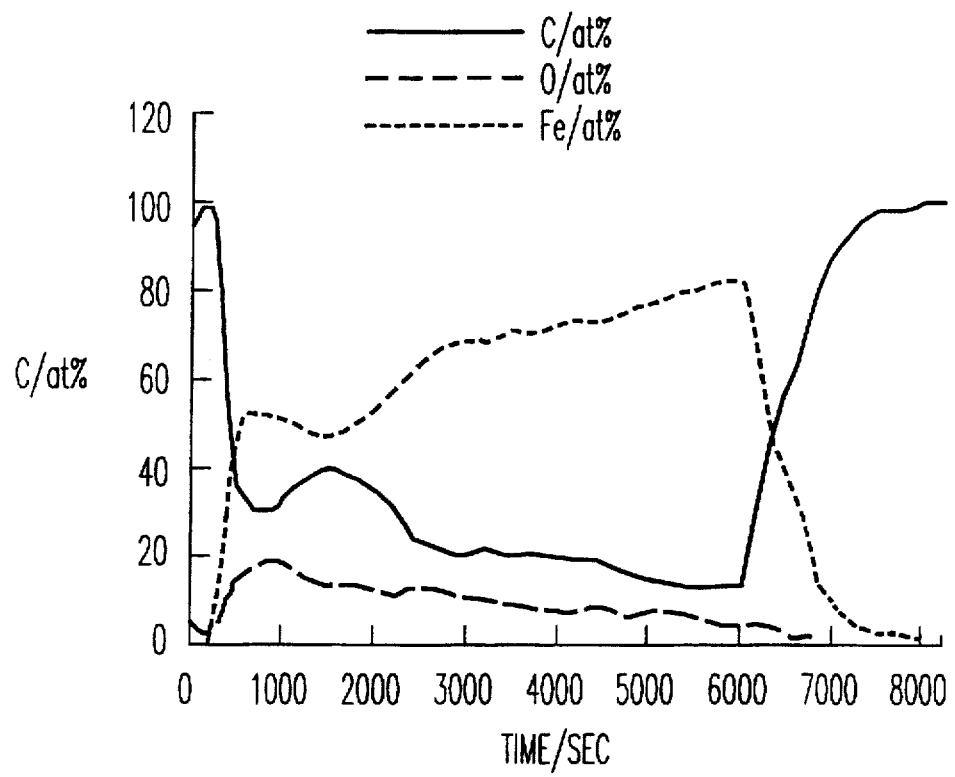

The profile derived from the Auger electron spectroscopic analysis is shown in FIG. 24.

The Auger profile of FIG. 24 has the following characteristics.

B1 The magnetic layer 2 is an Fe—C—O magnetic layer.

B2 The upper layer of the magnetic layer 2 has the area where the O concentration is high, presenting the pattern having a peak value of the O concentration in the upper layer.

B4 $O_1$=19 at. %

B5 The Fe concentration becomes low at the point corresponding to the $O_1$.

B7 The magnetic layer 2 is composed of 67 at. % of Fe, 21 at. % of C and 8 at. % of O, respectively.

[Comparison-3]

The same way as Example-13 was done except that supply amounts of $CH_4$ to the ion gun 19b and $O_2$ to the ion gun 19a set at a changed position were 50 sccm and 10 sccm, respectively. The 8 mm VTR magnetic tape shown in FIG. 1 was obtained.

The magnetic layer 2 has a thickness of 1500 Å, a coercive force Hc of 1090 Oe, a saturated magnetic induction Bs of 5400 G and Br/Bs of 0.78.

The magnetic layer 2 had a oblique column structure shown in FIG. 2.

The magnetic tape was subjected to the measurement of an Auger electron spectroscopic analysis unit. The measurement conditions were the same as the Example-1.

Figure 25:
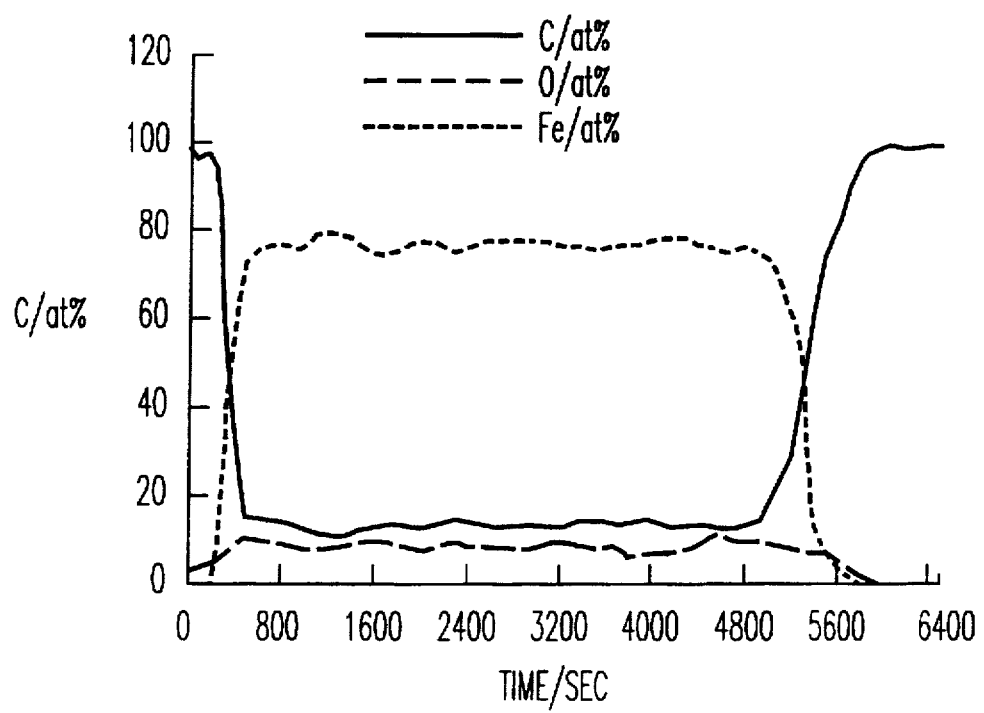

The profile derived from the Auger electron spectroscopic analysis is shown in FIG. 25.

The Auger profile of FIG. 25 has the following characteristics.

The magnetic layer 2 contained 74 at. % of Fe, 15 at. % of C and 11 at. % of O, respectively.

[Characteristics]

Each magnetic tape obtained from Example-13 to Example-16 and a Comparison-3 was subjected to measurement for the corrosion resistance and a loss degree in an output waveform (envelope). The measurement results are shown in Table-4.

TABLE 4

|      | Corrosion resistance (%) | Front loss ratio (%) | Rear loss ratio (%) |
| ---- | --- | --- | --- |
| E-13 | 3 | 95 | 95 |
| E-14 | 1 | 90 | 97 |
| E-15 | 2 | 91 | 95 |
| E-16 | 1 | 90 | 99 |
| C-3  | 6 | 75 | 87 |

*corrosion resistance: Each magnetic tape was left under 90% RH condition at 60° C. for one week. The corrosion resistance was defined by the decrease in the saturated magnetic induction.
*Front loss ratio (Rear loss ratio): A deck as a modified commercial Hi8 VTR was used. A luminance signal at 10 MHz was input and the reproduced waveform was detected with an oscilloscope. The front (rear) loss ratio was defined by a ratio (%) of the minimum value of the front (rear) part of the waveform to the average value of the middle part of the waveform. As the obtained value gets closer to the value 100, the resultant condition becomes more excellent.

What is claimed is:

1. A magnetic recording medium comprising a substrate and a magnetic layer, wherein;

said magnetic layer is coated on said substrate, said magnetic layer is an Fe—C—O magnetic layer and has a oblique column structure, and an O concentration (at. %) Oc in a center part of said column and an O concentration (at. %) Os around a surface part of said column satisfy an equation [I] as follows:

Equation [I]:

$Oc < Os$.

2. The magnetic recording medium of claim 1, wherein a C concentration (at. %) Cc in a center part of said column and a C concentration (at. %) Cs around a surface part of said column satisfy an equation [II] as follows:

Equation [II]:

$Cc < Cs$.

3. The magnetic recording medium of claim 1, wherein each concentration (at. %) of Fe, C and O satisfies an equation [III] as follows:

Equation [III]:

50 at. % ≤ Fe concentration ≤ 90 at. %

5 at. % ≤ C concentration ≤ 35 at. %

5 at. % ≤ O concentration ≤ 35 at. %.

4. The magnetic recording medium of claim 1, wherein said magnetic layer has a thickness ranging from 800 to 5000 Å.

5. A magnetic recording medium comprising a substrate and a magnetic layer, wherein said magnetic layer is coated on said substrate, said magnetic layer is an Fe—C—O magnetic layer, and each profile of an Fe concentration, an O concentration and a C concentration derived from Auger electron spectroscopic analysis to said magnetic layer (a spattering direction is oblique to said magnetic layer) is shown in a graph taking each concentration of Fe (at. %), C (at. %) and O (at. %) (Fe/at. %+C/at. %+O/at. %=100%) as an axis of ordinate and taking a spattering time as an axis of abscissa, each concentration of Fe and O has a wave pattern.

6. The magnetic recording medium of claim 5, wherein each profile of said Fe concentration and said O concentration has a wave pattern having 5% or more amplitude deviation in a graph of Auger electron spectroscopic analysis to said magnetic layer (spattering direction is oblique to said magnetic layer) taking each concentration of Fe (at. %), C (at. %) and O (at. %) (Fe/at. %+C/at. %+O/at. %=100%) as an axis of ordinate and taking a spattering time as an axis of abscissa.

7. The magnetic recording medium of claim 5, wherein a profile of a C concentration has a wave pattern in a graph of Auger electron spectroscopic analysis to said magnetic layer (spattering direction is oblique to said magnetic layer.) taking each concentration of Fe (at. %), C (at. %) and O (at. %) (Fe/at. %+C/at. %+O/at. %=100%) as an axis of ordinate and taking a spattering time as an axis of abscissa.

8. The magnetic recording medium of claim 5, wherein a profile of a C concentration has a wave pattern having 5% or more amplitude deviation in a graph of Auger electron spectroscopic analysis to said magnetic layer (spattering direction is oblique to said magnetic layer.) taking each concentration of Fe (at. %), C (at. %) and O (at. %) (Fe/at. %+C/at. %+O/at. %=100%) as an axis of ordinate and taking a spattering time as an axis of abscissa.

9. The magnetic recording medium of claim 5, wherein said magnetic layer has a oblique column structure and an O concentration (at. %) Oc in a center part of said column and an O concentration (at. %) Os around a surface of said column satisfy an equation [I] as follows.

Equation [I]:

$$Oc < Os.$$

10. The magnetic recording medium of claim 5, wherein said magnetic layer has a oblique column structure and an C concentration (at. %) Cc in a center part of said column and an C concentration (at. %) Cs around a surface of said column satisfy an equation [II] as follows.

Equation [II]:

$$Cc < Cs.$$

11. The magnetic recording medium of claim 5, wherein each concentration of Fe (at. %), C (at. %) and O (at. %) of said magnetic layer satisfies an equation [III] as follows:

Equation [III]:

$$50 \text{ at. } \% \leq \text{Fe concentration} \leq 90 \text{ at. } \%$$

$$5 \text{ at. } \% \leq \text{C concentration} \leq 35 \text{ at. } \%$$

$$5 \text{ at. } \% \leq \text{O concentration} \leq 35 \text{ at. } \%.$$

12. A magnetic recording medium comprising a substrate and a magnetic layer, wherein said magnetic layer is coated on said substrate, said magnetic layer is an Fe—C—O magnetic layer, each of an upper layer and a lower layer of said magnetic layer has an area of higher O concentration than an area between said upper layer and lower layer of said magnetic layer.

13. The magnetic recording medium of claim 12, wherein said upper layer of said magnetic layer ranges from an uppermost surface of said magnetic layer to a depth $\frac{1}{7}$ of a thickness of said magnetic layer and said lower layer of said magnetic layer ranges from a depth $\frac{6}{7}$ of a thickness of said magnetic layer to a bottom surface thereof.

14. The magnetic recording medium of claim 12, wherein a peak value $O_1$ of an O concentration in an upper layer of said magnetic layer ranges from 10 to 50 at. % and a peak value $O_2$ of an O concentration in said lower layer ranges from 10 to 50 at. %.

15. The magnetic recording medium of claim 12, wherein a peak value $O_1$ of an O concentration in an upper layer of said magnetic layer ranges from 10 to 50 at. % and a peak value $O_2$ of an O concentration in said lower layer ranges from 10 to 50 at. %, a value $O_3$ of O concentration in a middle layer between said upper layer and lower layer of said magnetic layer ranges from 5 to 35 at. %, each value of said $O_1$, $O_2$ and $O_3$ satisfies the equations $O_1 > O_3$ and $O_2 > O_3$.

16. The magnetic recording medium of claim 12, wherein an Fe concentration becomes low at points corresponding to peak values $O_1$ and $O_2$ of said O concentration.

17. The magnetic recording medium of claim 12, wherein a C concentration in a middle layer between an upper layer and a lower layer of said magnetic layer is constant.

18. The magnetic recording medium of claim 12, wherein each concentration of Fe (at. %), C (at. %) and O (at. %) of said magnetic layer satisfies an equation [III] as follows:

Equation [III]:

$$50 \text{ at. } \% \leq \text{Fe concentration} \leq 90 \text{ at. } \%$$

$$5 \text{ at. } \% \leq \text{C concentration} \leq 35 \text{ at. } \%$$

$$5 \text{ at. } \% \leq \text{O concentration} \leq 35 \text{ at. } \%.$$

19. A magnetic recording medium comprising a substrate and a magnetic layer, wherein said magnetic layer is coated on said substrate, said magnetic layer is an Fe—C—O magnetic layer, and an O concentration in an upper layer of said magnetic layer is higher than an O concentration in a lower layer of said magnetic layer.

20. The magnetic recording medium of claim 19, wherein an upper layer of said magnetic layer ranges from an uppermost surface of a magnetic layer to a depth $\frac{1}{7}$ of a thickness of said magnetic layer and a lower layer of said magnetic layer ranges from a depth $\frac{6}{7}$ of the thickness of said magnetic layer to a bottom surface thereof.

21. The magnetic recording medium of claim 19, wherein a peak value $O_1$ of an O concentration of an upper layer of said magnetic layer ranges from 10 to 50 at. %.

22. The magnetic recording medium of claim 19, wherein an Fe concentration becomes low at a point corresponding to a peak value $O_1$ of said O concentration.

23. The magnetic recording medium of claim 19, wherein each concentration (at. %) of Fe, C and O of said magnetic layer satisfies an equation [III] as follows:

Equation [III]:

$$50 \text{ at. } \% \leq \text{Fe concentration} \leq 90 \text{ at. } \%$$

$$5 \text{ at. } \% \leq \text{C concentration} \leq 35 \text{ at. } \%$$

$$5 \text{ at. } \% \leq \text{O concentration} \leq 35 \text{ at. } \%.$$

* * * * *